United States Patent
James et al.

(10) Patent No.: US 10,083,291 B2
(45) Date of Patent: Sep. 25, 2018

(54) AUTOMATING INTERNET OF THINGS SECURITY PROVISIONING

(71) Applicant: Verisign, Inc., Reston, VA (US)

(72) Inventors: Stephen D. James, South Riding, VA (US); Andrew Fregly, Herndon, VA (US); Andrew Cathrow, Ashburn, VA (US)

(73) Assignee: VERISIGN, INC., Reston, VA (US)

( * ) Notice: Subject to any disclaimer, the term of this patent is extended or adjusted under 35 U.S.C. 154(b) by 145 days.

(21) Appl. No.: 15/052,751

(22) Filed: Feb. 24, 2016

(65) Prior Publication Data
US 2016/0248746 A1 Aug. 25, 2016

Related U.S. Application Data

(60) Provisional application No. 62/120,757, filed on Feb. 25, 2015.

(51) Int. Cl.
*H04L 29/06* (2006.01)
*G06F 21/45* (2013.01)
(Continued)

(52) U.S. Cl.
CPC ............ *G06F 21/45* (2013.01); *H04L 9/3247* (2013.01); *H04L 9/3263* (2013.01);
(Continued)

(58) Field of Classification Search
CPC ..... G06F 21/45; H04L 9/3247; H04L 9/3263; H04L 9/3268; H04L 61/1511;
(Continued)

(56) References Cited

U.S. PATENT DOCUMENTS 8,010,786 B1 8/2011 Ward
9,723,428 B2 * 8/2017 Park ................ H04W 4/005
(Continued)

OTHER PUBLICATIONS

Felipe Fernandez ; Opportunities and challenges of the Internet of Things for healthcare; IEEE; 2014; p. 263-266.*
(Continued)

*Primary Examiner* — Monjour Rahim
(74) *Attorney, Agent, or Firm* — Artegis Law Group, LLP

(57) ABSTRACT

In one embodiment, a security provisioning service automatically establishes trust in a device. Upon receiving a provisioning request, a security provisioning service identifies a verification item that is associated with the provisioning request. The security provisioning service performs one or more verification operations based on the provisioning request to determine whether the provisioning request is authorized. If the provisioning request is authorized, then the provisioning service establishes a verifiable identification for the device that is assured by the secure provisioning service and then executes the provisioning request. By automatically performing the verification operations to establish trust in the device, the provisioning service eliminates manual identification assurance operations that are performed as part of a conventional security provisioning process. Reducing the time and effort required to perform security provisioning increases the number of devices likely to implement security processes that increase the overall security of interacting using the Internet.

20 Claims, 10 Drawing Sheets

(51) Int. Cl.
*H04L 9/32* (2006.01)
*H04W 4/70* (2018.01)
*H04L 29/12* (2006.01)
*H04W 4/00* (2018.01)

(52) U.S. Cl.
CPC ........ *H04L 9/3268* (2013.01); *H04L 61/1511* (2013.01); *H04L 61/3025* (2013.01); *H04L 63/0823* (2013.01); *H04W 4/005* (2013.01); *H04W 4/70* (2018.02); *H04L 61/2015* (2013.01); *H04L 61/305* (2013.01)

(58) Field of Classification Search
CPC ............. H04L 61/3025; H04L 63/0823; H04L 61/2015; H04L 61/305; H04W 4/005
USPC .......................................................... 713/156
See application file for complete search history.

(56) References Cited

U.S. PATENT DOCUMENTS

| | | | |
|---|---|---|---|
| 2008/0201575 A1 | 8/2008 | Van Der Rijn | |
| 2014/0089660 A1* | 3/2014 | Sarangshar | H04L 9/3234 713/156 |
| 2014/0173756 A1* | 6/2014 | Chhabra | G06F 21/10 726/29 |
| 2016/0056964 A1* | 2/2016 | Andiappan | H04L 9/3263 713/189 |
| 2016/0182497 A1* | 6/2016 | Smith | H04L 63/0853 713/156 |
| 2016/0182499 A1* | 6/2016 | Sharaga | H04L 63/0853 713/156 |
| 2016/0262199 A1* | 9/2016 | Patil | H04W 8/005 |
| 2017/0019873 A1* | 1/2017 | Britt | H04W 64/00 |
| 2017/0070350 A1* | 3/2017 | Ryu | H04L 9/3247 |
| 2017/0171178 A1* | 6/2017 | Reynders | H04L 63/08 |
| 2017/0195318 A1* | 7/2017 | Liu | H04L 63/0823 |

OTHER PUBLICATIONS

Extended European Search Report Application No. 16157447.0, dated Jun. 21, 2016, 6 pages.
Anonymous: "Configuring Authorization Policies [Cisco Identity Services Engine]—Cisco Systems", Oct. 2, 2014, XP055412315, URL: https://web.archive.org/web/20141002071955/https://www.cisco.com/en/US/docs/security/ise/1.0/user_guide/ise10_authz_polprfls.html.

* cited by examiner

AUTOMATING INTERNET OF THINGS SECURITY PROVISIONING

CROSS-REFERENCE TO RELATED APPLICATIONS

This application claims benefit of the U.S. Provisional Patent Application having Ser. No. 62/120,757 and filed on Feb. 25, 2015. The subject matter of this related application is hereby incorporated herein by reference.

BACKGROUND OF THE INVENTION

Field of the Invention

Embodiments of the present invention relate generally to secure electronic communications and, more specifically, to automating Internet of Things security provisioning.

Description of the Related Art

As time passes, the number of devices that are connected through networks is expected to steadily increase. With the advent of the "Internet of Things" (IoT), where any physical device with an Internet Protocol (IP) address can connect to the Internet, the number of Internet-connected devices is anticipated to increase by one to two orders of magnitude in the next decade. In addition to computer-based physical devices such as laptop and tablets, "IoT devices" are expected to include buildings, vehicles, wearable technologies, traffic lights, parking meters, and the like.

To protect IoT devices from unauthorized accesses as well as the privacy of data communicated between IoT devices through the Internet, there is a basic set of security functions that many IoT devices implement when connecting to the Internet. For example, authentication, encryption, and authorization security functions are typically enabled for IoT devices as part of the security provisioning process when those devices connect to the Internet. Authentication provides assurance between interacting IoT devices as to the identity of the IoT devices and the authenticity of the data exchanged by those devices. Encryption is applied to data communicated through the Internet to protect the privacy of the data. Authorizations specify the types of interactions in which a given IoT device can engage.

One commonly accepted approach for both device authentication and data encryption is implementing a Public Key Infrastructure (PKI). A PKI uses asymmetric cryptographic key pairs (public/private) associated with a single identity to enable authentication and encryption mechanisms. Each key pair is used to reliably identify devices and/or users associated with a particular identity to other devices and/or other users. A core premise of the PKI is that there is a trusted way of verifying the authenticity of the key pair being used by the particular identity. Typically, a "trusted authority" provides assurance of the legitimacy of the key pairs associated with an identity and verifies linkages between public keys and identities.

A substantial challenge that has prevented the universal adoption of PKI is the logistical difficulty of verifying the linkage between a public key and an identity. For example, during "authorization provisioning" for a particular IoT device, a system engineer could manually generate a key pair that includes a public key and a private key. The system engineer could store the private key in a memory associated with the IoT device. Subsequently, the system engineer could identify a trusted authority that is authorized to generate and sign authorization credentials. The system engineer could then interact with the trusted authority to verify the identity of the IoT device. After the system engineer has established the identity of the IoT device, the system engineer could request that the trusted authority generate and sign an authorization credential that includes the identity of the IoT device and the public key. Thereafter, the IoT device would provide the signed authorization credential to other IoT devices to provide a trusted linkage between the public key and the IoT device and an assurance that the key pair that includes the public key is legitimate.

The time, cost, and expertise associated with the manual efforts involved in the authorization provisioning process have discouraged the adoption of PKI. Further, other commonly accepted approaches to security provisioning for IoT devices require similar manual activities that discourage the adoption of such approaches in the same way. Such manual processes cannot be scaled effectively to accommodate the anticipated increase in the number of IoT devices, which creates a potential security gap in the IoT infrastructure.

As the foregoing illustrates, what is needed in the art are more effective techniques for performing security provisioning for Internet of Things (IoT) devices.

SUMMARY OF THE INVENTION

One embodiment of the present invention sets forth a computer-implemented method for establishing trust in a device when provisioning the device. The method includes receiving a provisioning request associated with the device; determining a verification item based on the provisioning request; determining, via a processor, that one or more provisioning operations are authorized based on the verification item; and performing the one or more provisioning operations to establish a verifiable identification for the device.

Another embodiment of the present invention sets forth a computer-readable storage medium including instructions. The instructions, when executed by a processor, cause the processor to perform the steps of determining distinguishing information associated with a first device in response to a first provisioning request; selecting at least one authorization template included in a template database based on the distinguishing information; and generating a first authorization credential for the first device based on the at least one authorization template.

Another embodiment of the present invention sets forth a system. The system includes a memory storing a provisioning engine; and a processor that is coupled to the memory and, when executing the provisioning engine, is configured to receive a provisioning request associated with a device; determine a verification item based on the provisioning request; determine that one or more provisioning operations are authorized based on the verification item; perform the one or more provisioning operations to generate a provisioning item; and sign the provisioning item to generate a signed provisioning item.

One advantage of the disclosed techniques is that automating security provisioning for Internet of Things (IoT) devices dramatically reduces the time, cost, and expertise required to provision IoT devices compared to conventional, primarily manual techniques. Further, unlike such conventional techniques, the disclosed techniques scale effectively to accommodate the anticipated increase in the number of IoT devices.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

Internet of Things (IoT) System Overview

Figure 1:
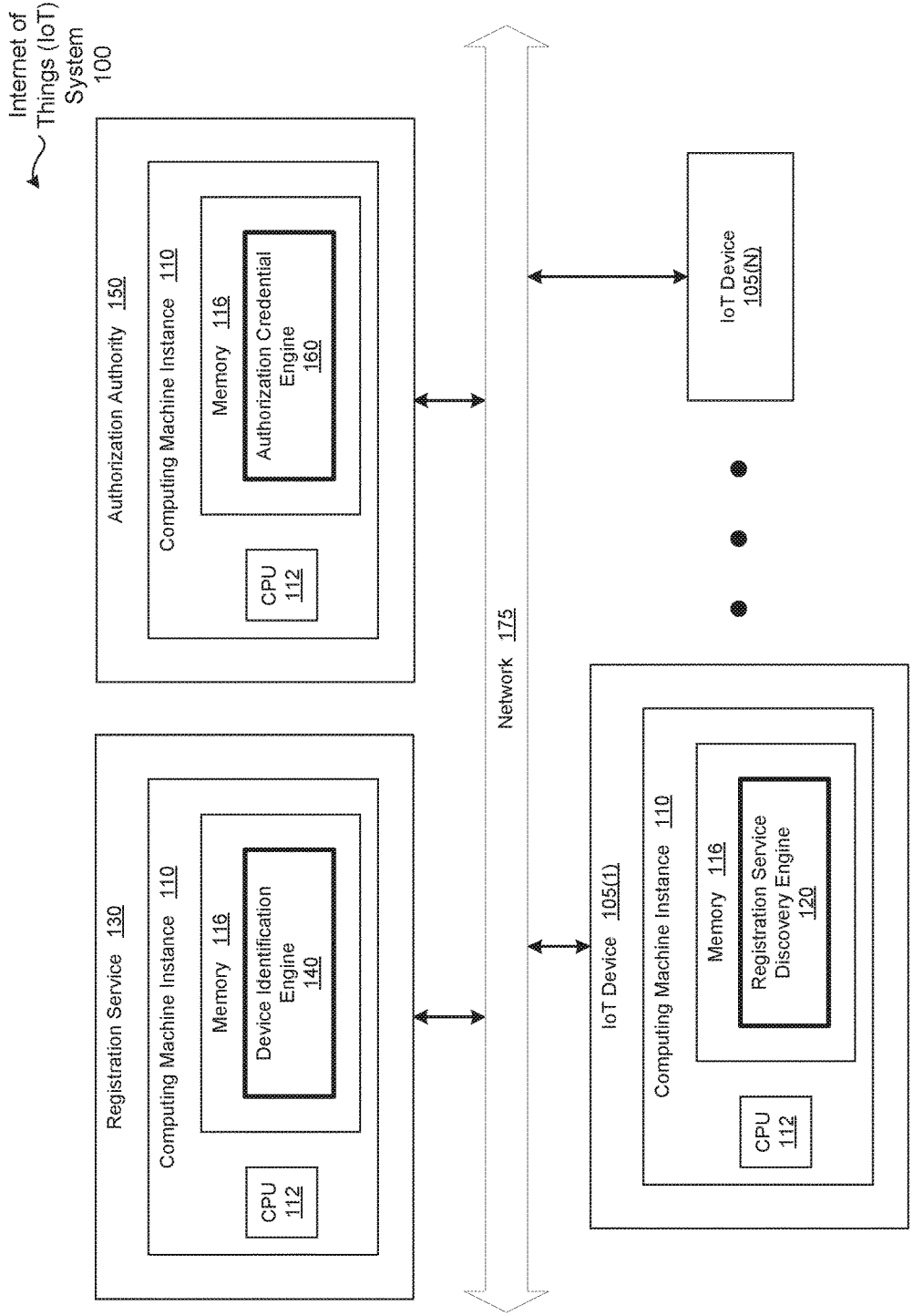
FIG. 1 is a conceptual illustration of an Internet of Things (IoT) system configured to implement one or more aspects of the present invention.

FIG. 1 is a conceptual illustration of a Internet of Things (IoT) system 100 configured to implement one or more aspects of the present invention. As shown, the IoT system 100 includes, without limitation, any number of IoT devices 105, a registration service 130, and an authorization authority 150. For explanatory purposes, multiple instances of like objects are denoted with reference numbers identifying the object and parenthetical numbers identifying the instance where needed.

As shown, the components included in the IoT system 100 are connected through a network 175. In alternate embodiments, any number of the components may be connected through any number of communications paths that implement any suitable communication protocols. Further, different communications may use different protocols as known in the art. For example, the IoT device 105(1) could communicate with the other IoT devices 105(2:N) through a multicast. More specifically, the IoT device 105(1) could generate a single transmission for distribution to any number of recipients connected through the network 175. By contrast, the IoT device 105(1) could communicate with the registration service 130 through a unicast. A unicast is a single transmission directed to a single recipient and transmitted through the network 175.

For explanatory purposes, the general ability of a particular object to communicate through the network 175 is depicted as a single line connecting the object to the network 175. Although not shown in FIG. 1, a specific communication between two objects may be depicted with or without the network 175. For example, a unicast may be depicted as a single line connecting the sender to the recipient. By contrast, a multicast may be depicted as a single line connecting the sender to the network 175 in addition to multiple lines connecting the network 175 to each of the recipients.

Each of the IoT devices 105 may be any type of electronic device that is capable of communicating with other electronic devices. For example, the IoT devices 105 could include conventional computing devices, smart phones, wearable technology devices, appliances (e.g. washer/dryers that utilize network communications, smart thermostat systems, etc.), sensors (e.g. remote monitoring heart monitoring implants, biochip transponders, automobiles sensors, etc.), traffic lights, parking meters, and the like.

Each of the IoT devices 105 includes the necessary hardware and software to communicate with other IoT devices 105, the registration service 130 and the authorization service 150 using various protocols. In some embodiments, such protocols may include publish-subscribe protocols, i.e., Message Queue Telemetry Transport (MQTT), and Domain Name System (DNS) processes and services. In alternate embodiments, each of the IoT devices 105 may be indirectly connected to the registration service 130 and/or the authorization authority 150 through any number of intermediaries. In such embodiments, the hardware and/or software included in each of the IoT devices 105 may be modified to enable indirect communications with the registration service 130 and the authorization service 150.

As a general matter, the Internet utilizes communication processes, such as DNS related standards, that can be leveraged in a number of ways to support data authentication, encryption, and authorization security functions for the IoT devices 105. Authentication provides assurance between interacting IoT devices 105 as to the identity of the IoT devices 105 and the authenticity of the data exchanged by the IoT devices 105. Encryption is applied to data communicated through the Internet to protect the privacy of the data. Authorizations specify the types of interactions in which a given IoT device 105 can engage.

The DNS is the part of the Internet infrastructure that translates human-readable domain names into the Internet Protocol (IP) numbers needed to establish TCP/IP (Transmission Control Protocol/Internet Protocol) communication over the Internet. The DNS allows users to refer to web sites, and other resources, using intuitive domain names, such as "www.example.com", rather than the numeric IP addresses associated with a website, e.g., 192.0.2.78, and assigned to devices on the Internet. Each domain name can be made up of a series of character strings (e.g., labels) separated by dots. The order of the labels represents a relationship between domain names within the DNS hierarchy.

For example, if the IoT devices 105 were owned by "Company A," then the domain could be "companyA.iot-service.example.com." Further, the domain name of the IoT device 105(D) could be "iotdeviceD.companyA.iotservice.example.com." The domain and the domain names for each of the IoT devices 105 allow other "entities" connected to the network 175 to locate and communicate with the IoT devices 105. Such entities may include, without limitation, other IoT devices 105, software applications used to monitor and/or control the IoT devices 105, IoT services, gateways, and so forth.

To enable secure communications between two entities, the entities use authentication mechanisms that provide assurance that the information was transmitted from the expected source and was not modified in transit. A reliable authentication mechanism provides assurance even when the information passed through one or more untrusted intermediaries. The IoT system 100 implements an authentication mechanism that is based on a Public Key Infrastructure (PKI). The PKI uses asymmetric cryptographic key pairs (public/private) associated with a single identity to enable authentication and encryption mechanisms.

As part of provisioning a particular IoT device 105 to securely operate within the PKI infrastructure, a key pair associated with the IoT device 105 is generated. The IoT device 105 stores the private key in secure memory that is accessible only to the IoT device 105 and a binding is created between the name of the IoT device 105 and the public key 105 in a globally accessible registry. The private key is used by the IoT device 105 for signing data to be sent and decrypting data that is received. The public key is used by entities wishing to verify the authenticity of signed data received from the IoT device 105 and/or to encrypt data to be sent to the IoT device 105.

A core premise of the PKI is that there is a trusted way of verifying the authenticity of the key pairs being used by the IoT devices 105. Mechanisms for authentication typically use trusted authorities to provide assurance of the legitimacy of the key pairs associated with the IoT devices 105. Some such mechanisms are based on DNS. For example, the IoT system 100 may implement DNS-based Authentication of Named Entities (DANE) processes to register and authenticate the IoT devices 105. DANE provides a mechanism for associating the public key or a certificate containing a public key with the IoT device 105 that can be identified using a unique domain name associated with the IoT device 105. This association of the IoT device 105 with a public key or certificate containing a public key is stored in DNS registry records that are identified by the unique domain name associated with the IoT device 105.

However, the time, cost, and expertise required to perform security provisioning for the IoT devices 105 included in a conventional IoT system may discourage the adoption of the associated security processes. For example, performing authentication provisioning to enable each of the IoT devices 105 included in a conventional IoT system to operate based on the PKI typically involves performing multiple manual operations. First, the key pair associated with a particular IoT device 105 is manually generated and stored in secure memory that is accessible only to the IoT device 105. Subsequently, a trusted authority is manually identified and configured to create a binding between the name of the IoT device 105 and the public key 105 and to store the binding in the DNS registry. Notably, as part of creating the binding, the trusted authority may require manual-based verification of the name of the IoT device 105. This manually-based process is repeated for each of the IoT devices 105 included in the conventional IoT system.

Other commonly accepted approaches for performing security provisioning for the IoT devices 105 included in conventional IoT systems require similar manual activities that discourage the adoption of such approaches in the same way. For example, prior to interacting with a particular IoT device 105, entities often require the IoT device 105 to present an authorization credential that identifies the types of interactions in which the IoT device 105 can engage. As part of authorization provisioning, such authorization credentials are manually generated. A trusted authority is configured to verify the identity of the IoT device 105 and then sign the authorization credential. The signed authorization credential is manually installed on the IoT device 105.

To reduce the time, cost, and expertise involved in security provisioning operations, any number (including zero) of computing machine instances 110 included in the IoT devices 105, the registration service 130, and the authorization authority 150 automate the security provisioning process. Each of the computing machines instances 110 includes, without limitation, any number of central processing units (CPUs) 112 and a memory 116. In operation, the CPU 112 is the master processor of the computing machine instance 110, controlling and coordinating operations of other components included in the computing machine instance 110. The memory 116 stores content, such as software applications and data, for use by the CPU 112 of the computing machine instance 110.

In alternate embodiments, any number of the IoT devices 105, the registration service 130, and the authorization authority 150 may be configured to automate the security provisioning operations in any technically feasible fashion. For example, in some embodiments, the IoT devices 105 may interact with a cloud (e.g., encapsulated shared resources, software, data, etc.) to automate security provisioning operations. In such embodiments, the IoT devices 105 may not include the computing machine instances 110. Further, in alternate embodiments, any number and combination of the IoT devices 105, the registration service 130, and the authorization authority 150 may or may not automate any number of security provisioning operations. For example, in some embodiments, the registration service 130 may automatically perform authentication provisioning for the IoT devices 105, but the authorization authority 150 may not automatically perform authorization provisioning for the IoT devices 105.

As shown, a registration service discovery engine 120 is stored in the memory 116 associated with the IoT device 105 and executes on the CPU 112 associated with the IoT device 105. The registration service discovery engine 120 enables the IoT device 105 to automatically "discover" a trusted authority for performing provisioning operations. As described in detail in FIGS. 2 and 3, in some embodiments, the registration service discovery engine 120 identifies the trusted authority based on communications with other IoT devices 150 connected through the network 175. As described in detail in FIGS. 4 and 5, in some other embodiments, the registration service discovery engine 120 identifies the trusted authority based on DNS and/or DANE.

The trusted authorities include, without limitation, the registration service 130 and the authorization authority 150. The registration service 130 provides assurance between interacting IoT devices 105 as to the identity of the IoT devices 105 and the authenticity of the data exchanged by the IoT devices 105. The authorization authority 150 provides mechanisms for specifying what types of interactions in which the IoT devices 105 can engage. In alternate embodiments, the IoT system 100 may include any number and type of trusted authorities in any combination. For example, in some embodiments, the IoT system 100 may include multiple signing authorities. In some embodiments, the signing authorities may include a certificate authority (CA) that issues PKI certificates that are signed with the private key associated with the CA. Other signing authorities may implement a single "symmetric" key for both data encryption and decryption during short-lived data exchange sessions.

As shown, a device identification engine 140 is stored in the memory 116 associated with the registration service 130 and executes on the CPU 112 associated with the registration service 130. The device identification engine 140 enables the registration service 130 to automatically establish trust in a particular IoT device 105 as part of authentication provisioning. More specifically, as described in detail in FIGS. 7 and 8, the device identification engine 140 is configured to establish trust based on a predetermined "verification" item associated with the IoT device 105. The alternate embodiments, the device identification engine 140 may be implemented externally to the registration service 130. In such embodiments, the device identification engine 140 and the registration service 130 may communicate in any technically feasible fashion.

The verification item may be any technically feasible item that enables the device identification engine 140 to reliably identify the IoT device 105. For example and without limitation, in various embodiments, the verification item may be a digital signature, an Internet Protocol (IP) number, a domain name, or a certificate that includes a public key. In alternate embodiments, any entity included in the IoT system 100 may implement the device identification engine 140 to automatically establish trust in the IoT devices 105 connected to the network 175. For example, in alternate embodiments, the authorization authority 150 may implement the device identification engine 140 to automatically establish trust in IoT devices 105 as part of authorization provisioning.

As also shown, an authorization credential engine 160 is stored in the memory 116 associated with the authorization authority 150 and executes on the CPU 112 associated with the authorization authority 150. The authorization credential engine 160 enables the authorization authority 150 to automatically generate an authorization credential for a particular IoT device 105. More precisely, as described in detail in FIGS. 9 and 10, for a particular IoT device 105, the authorization credential engine 160 identifies one or more authorization templates based on "distinguishing" information associated with the IoT device 105.

The distinguishing information may include any number and type of items or characteristics associated with the IoT device 105 that enables the authorization authority engine 150 to identify authorization templates that are associated with the IoT device 105. For example and without limitation, in various embodiments, the distinguishing information may be an Enhanced Privacy Identification (EPID) public key that is included in an request to generate authorization credentials. In yet other embodiments, the distinguishing information may be or a function of the IoT device 105 on the network 175 or a device type (e.g., controller) associated with the IoT device 105.

Note that the techniques described herein are illustrative rather than restrictive, and may be altered without departing from the broader spirit and scope of the invention. In some embodiments, the entire security provisioning process may be automated based on the techniques outlined herein. In other embodiments, one or more portions of the security provisioning process may be automated. As a general matter, the techniques outlined herein are applicable to automating security provisioning for IoT devices 105 using any number and type of infrastructure and/or protocols that support data authentication, encryption, and authorization security functionality.

For example, in some embodiments, the registration service 130 and/or the authorization authority 150 may leverage other Internet-related processes instead of or in addition to DNS and/or DANE processes to facilitate security, privacy, communications, and data processing for the IoT devices 105. Further, in alternate embodiments, the IoT system 100 may support authorization based on a username/password combination, an API key, or a X.509 client certificate. In such embodiments, many modifications and variations on the functionality provided by the registration service discovery engine 120, the device identification engine 140, and/or the authorization credential engine 160 will be apparent to those of ordinary skill in the art without departing from the scope and spirit of the described embodiments.

Discovering Trusted Authorities

Figure 2:
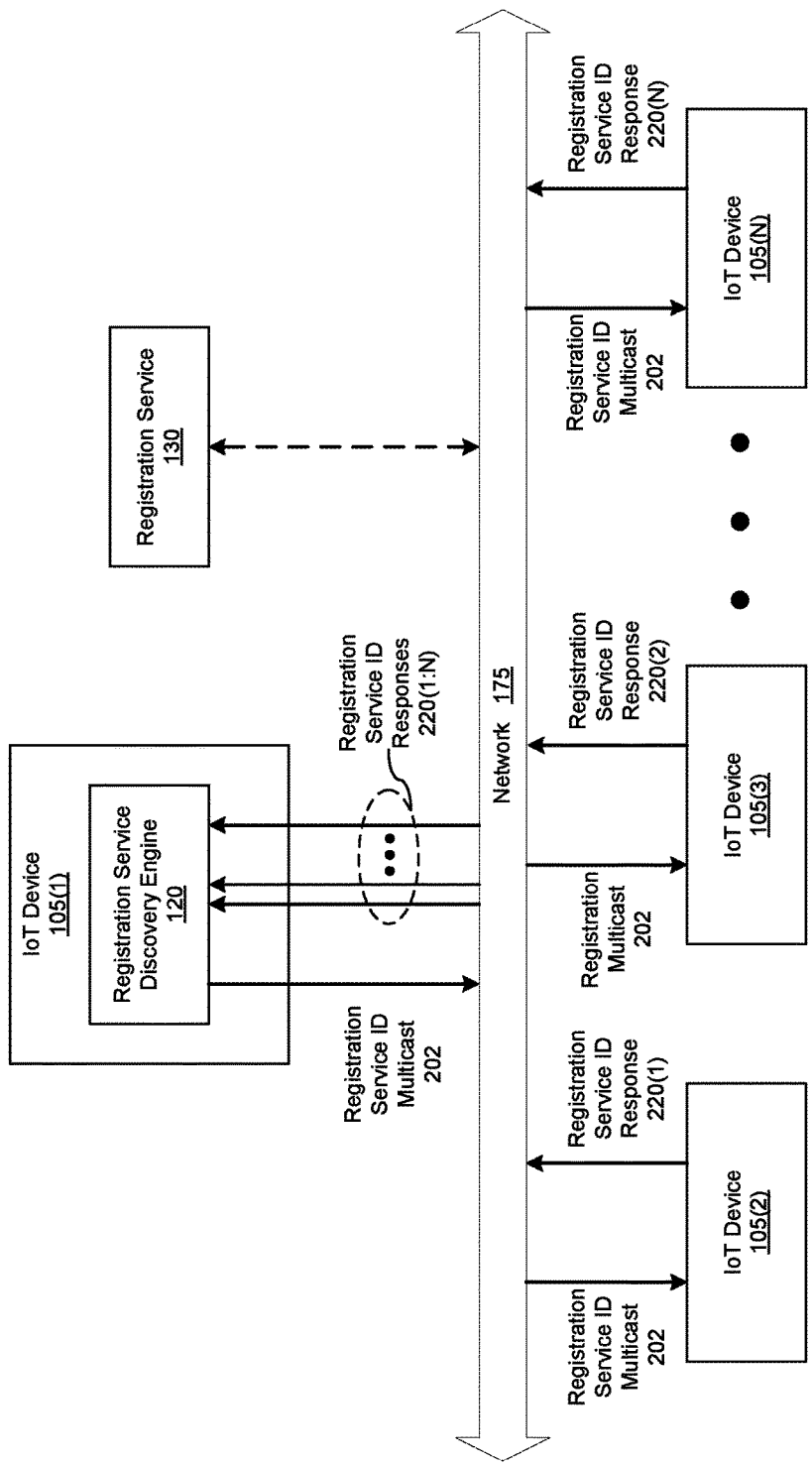
FIG. 2 illustrates how the Internet of Things (IoT) device of FIG. 1 identifies the registration service through a multicast, according to various embodiments of the present invention.

FIG. 2 illustrates how the Internet of Things (IoT) device 105(1) of FIG. 1 identifies the registration service 130 through a multicast, according to various embodiments of the present invention. In operation, the registration service discovery engine 120(1) included in the IoT device 105(1) identifies the registration service 130 as part of automating the secure provisioning process for the IoT device 105(1). The registration service discovery engine 120(1) may execute in response to any indirect or direct trigger. For example, in some embodiments, the registration service discovery engine 120(1) initiates the security provisioning for the IoT device 105 when the IoT device 105 is first connected to the network 175.

As shown, to discover the registration service 130, the registration service discovery engine 120(1) included in the IoT device 105(1) issues a registration service ID multicast 210 through the network 175. The registration service ID multicast 202 includes, without limitation, a unique and verifiable identification of the IoT device 105(1). Further, in some embodiments, the registration service ID multicast 202 may include a public key associated with the IoT device 105(1). In yet other embodiments, the IoT device 105(1) may cryptographically sign the registration service ID multicast 202. In alternate embodiments, the registration service discovery engine 120(1) may issue any number and type of identification requests in any technically feasible fashion.

Upon receiving the registration service ID multicast 202, other entities connected to the network 175 that are configured to respond to the registration service ID multicast 202 generate registration service ID responses 220. In particular, upon receiving the registration service ID multicast 202, the registration service discovery engines 120 included in the other IoT devices 105 unicast the registration service ID responses 220 to the IoT device 105(1). Each of the registration service ID responses 220 identifies the registration service 130, the public key associated with the registration service 130, the responding IoT device 105, and the public key associated with the responding IoT device 105. The public key associated with the registration service 130 may be in the form of a PKI certificate associated with the registration service 130. Similarly, the public key associated with the IoT device 105 may be in the form of a certificate previously issued to the IoT device 105. Further, each of the responding IoT devices 105 cryptographically signs their registration service ID response 220 with their private key. In alternate embodiments, any number and type of entities may be configured to respond to the registration service ID multicast 202 in any technically feasible fashion.

Upon receiving the registration service ID responses 220, the registration service discovery engine 120(i) attempts to verify each of the registration service ID responses 220 based on the digital signature included in the registration service ID response 220. Methods for performing this type of verification are well known, such as performing certificate verification or DANE verification. In alternate embodiments, the registration service discovery engine 120(1) may attempt to verify the registration service ID responses 220 in any technically feasible fashion that is consistent with the information included in the registration service ID responses 220.

If, the registration service discovery engine 120(1) is unable to verify one or more of the registration service ID responses 220, then the registration service discovery engine 120(1) transmits an error message indicating that the registration service discovery engine 120(1) is unable to reliably identify the registration service 130. In alternate embodiments, the registration service discovery engine 120(1) may implement any number of error handling operations, including zero, instead of or in addition to transmitting the error message. Because the registration service discovery engine 120(1) does not identify the registration service 130, the security provisioning of the IoT device 105(1) is unsuccessful. Accordingly, the IoT device 105(1) may be precluded from exchanging confidential information with potentially malicious IoT devices 105.

If, however, the registration service discovery engine 120(1) is able to verify all the registration service ID responses 220, then the registration service discovery engine 120(1) compares the identifications of the registration services 130 included in the registration service ID responses 220. In particular, the registration service discovery engine 120(i) determines whether there is a consensus between the registration service ID responses 220 as to the identity of the registration service 130. If the registration service discovery engine 120(i) determines that there is not such a consensus, then the registration service discovery engine 120(i) does not identify the registration service 130 and the security provisioning of the IoT device 105(1) is unsuccessful.

If, however, the registration service discovery engine 120(1) successfully validates all the registration service ID responses 220 and determines that there is a consensus between the registration service ID responses 220, then the registration service discovery engine 120(i) identifies the registration service 130. More specifically, the registration service discovery engine 120(1) identifies the registration service 130 based on the single identification for the registration service 130 included in all the registration service ID responses 220. In alternate embodiments, the registration service discovery engine 120(1) may identify any number and type of security provisioning services based on the registration service ID responses 220. The IoT device 105(1) may then interact with the registration service 130 to continue the secure provisioning for the IoT device 105(1).

In alternate embodiments, the registration service discovery engine 120(1) may be configured to process the registration service ID responses 220 in any technically feasible fashion. For example, in some embodiments, the registration service discovery engine 120(1) may be configured to disregard any of the registration service ID responses 220 that the registration service discovery engine 120(1) is unable to verify. Further, the registration service discovery engine 120(1) may be configured to identify the registration service 130 based on a majority of the registration service ID responses 220 instead of a consensus of the registration service ID responses 220. In alternate embodiments, any technically feasible configuration may be used to identify the registration service 130 based on any number of inputs in addition to the registration service ID responses 220.

In other alternate embodiments, the techniques implemented in the registration service discovery engine 120(1) included in the IoT device 105(1) may be adapted to identify any service that facilitates the provisioning of security functionality for the IoT device 105(1). For example, in some embodiments, the registration service discovery engine 120(1) may be replaced with a provisioning service discovery engine that identifies both the registration service 130 and the authorization authority 150 based on the techniques described herein for discovering the registration service 130.

Figure 3:
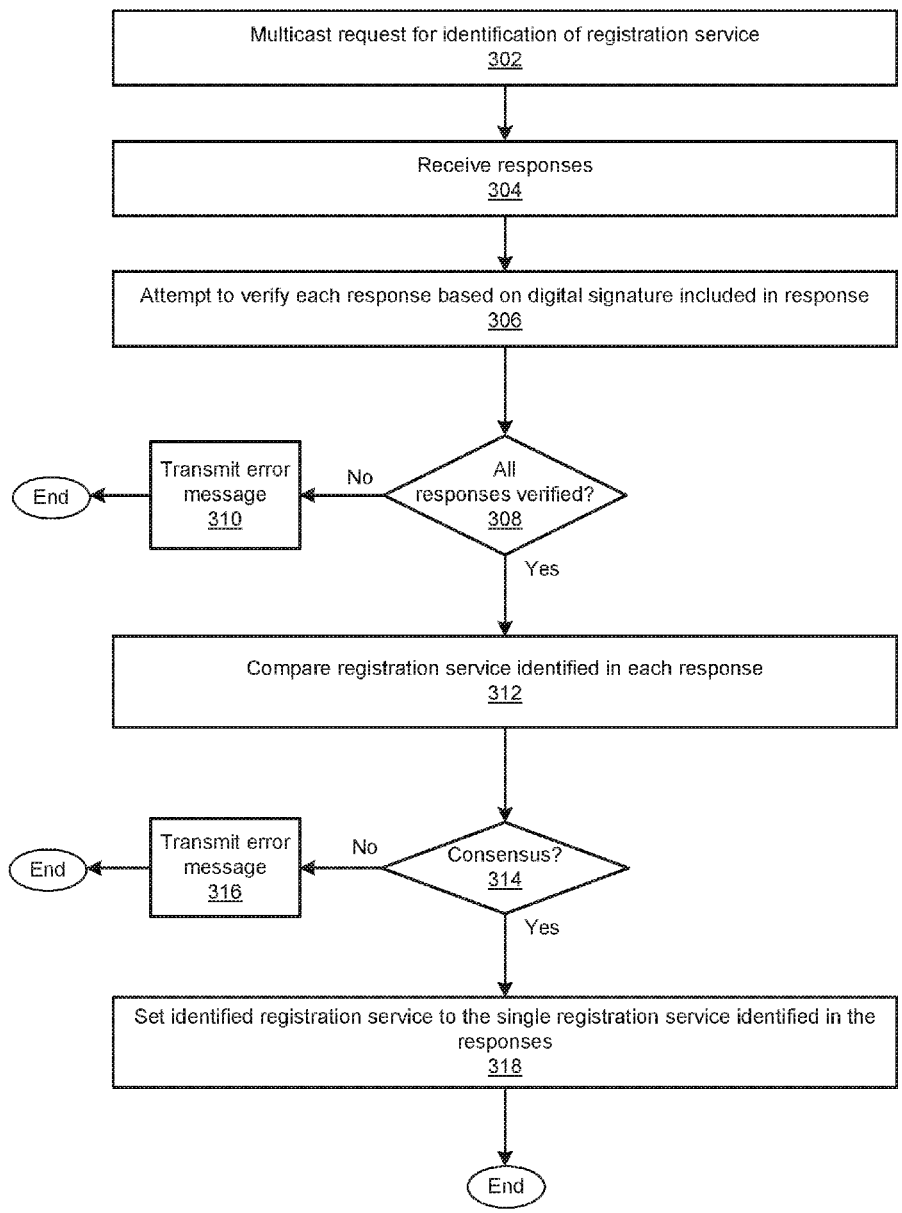
FIG. 3 is a flow diagram of method steps for identifying a registration service through a multicast, according to various embodiments of the present invention.

FIG. 3 is a flow diagram of method steps for identifying a registration service through a multicast, according to various embodiments of the present invention. Although the method steps are described with reference to the systems of FIGS. 1-2, persons skilled in the art will understand that any system configured to implement the method steps, in any order, falls within the scope of the present invention. Please note that, for purposes of discussion only, it is assumed that the registration service discovery engine 120(i) included in the IoT device 105(i) initiates the security provisioning for the IoT device 105(i) when the IoT device 105(i) is first connected to the network 175. In alternate embodiments, the registration service discovery engine 120(i) may initiate the security provisioning for the IoT device 105(i) in response to any indirect or direct trigger. As a general matter, the IoT device 105(i) identifies the registration service 130 as part of automating the secure provisioning process for the IoT device 105(i). In alternate embodiments, the techniques implemented in the registration service discovery engine 120(i) may be adapted to identify any service that facilitates the provisioning of security functionality for the IoT device 105(i).

As shown, a method 300 begins at step 302, where the registration service discovery engine 120(i) included in the IoT device 105(i) issues the registration service ID multicast 202 through the network 175. The registration service ID multicast 202 includes identifying information for the IoT device 105(i) and requests identification information for the registration service 130. Upon receiving the registration service ID multicast 202, other entities connected to the network 175 that are configured to respond to the registration service ID multicast 202 generate registration service ID responses 220.

In particular, upon receiving the registration service ID multicast 202, the registration service discovery engines 120 included in the other IoT devices 105 transmit the registration service ID responses 220 to the IoT device 105(i). The other IoT devices 105 may unicast or multicast the registration service ID responses 220. For example, the other IoT devices 105 could multicast the registration service ID responses 220 to enable monitoring and administrative services connected through the network 175 to receive the registration service ID responses 220. Each of the registration service ID responses 220 identifies the registration service 130, the public key associated with the registration service 130, the responding IoT device 105, and the public key associated with the responding IoT device 105. The public key associated with the registration service 130 may be in the form of a PKI certificate associated with the registration service 130. Similarly, the public key associated with the IoT device 105 may be in the form of a certificate previously issued to the IoT device 105. Further, each of the responding IoT devices 105 cryptographically signs their registration service ID response 220 with their private key. In alternate embodiments, any number and type of entities may be configured to respond to the registration service ID multicast 202 in any technically feasible fashion.

At step 304, the registration service discovery engine 120(i) receives the registration service ID responses 220. At step 306, the registration service discovery engine 120(i) attempts to verify each of the registration service ID responses 220 based on the digital signature included in the registration service ID response 220. Methods for performing this type of verification are well known, such as performing certificate verification or DANE verification. In alternate embodiments, the registration service discovery engine 120(i) may attempt to verify the registration service ID responses 220 in any technically feasible fashion that is consistent with the information included in the registration service ID responses 220.

At step 308, the registration service discovery engine 120(i) determines whether all the registration service ID responses 220 are verified. If, at step 308, the registration service discovery engine 120(i) determines that any of the registration service ID responses 220 are not verified, then the method 300 proceeds to step 310. At step 310, the registration service discovery engine 120(i) transmits an error message indicating that the registration service discovery engine 120(i) is unable to reliably identify the registration service 130. In alternate embodiments, the registration service discovery engine 120(i) may implement any number of error handling operations, including zero, instead of or in addition to transmitting the error message. The method 300 then terminates.

If, however, at step 308, the registration service discovery engine 120(i) determines that all the registration service ID responses 220 are verified, then the method 300 proceeds directly to step 312. At step 312, the registration service discovery engine 120(i) compares the identifications of the registration service 130 included in the registration service ID responses 220. At step 314, the registration service discovery engine 120(i) determines whether there is a consensus between the registration service ID responses 220 as to the identity of the registration service 130. If, at step 314, the registration service discovery engine 120(i) determines that there is not a consensus between the registration service ID responses 220 as to the identity of the registration service 130, then the method 300 proceeds to step 316. At step 316, the registration service discovery engine 120(i) transmits an error message indicating that the registration service discovery engine 120(i) is unable to reliably identify the registration service 130. In alternate embodiments, the registration service discovery engine 120(i) may implement any number of error handling operations, including zero, instead of or in addition to transmitting the error message. The method 300 then terminates.

If, however, at step 314, the registration service discovery engine 120(i) determines that there is a consensus between the registration service ID responses 220 as to the identity of the registration service 130, then the method 300 proceeds directly to step 318. At step 318, the registration service discovery engine 120(i) identifies the registration service 130 based on the single identification included in all the registration service ID responses 220, and the method 300 terminates.

Figure 4:
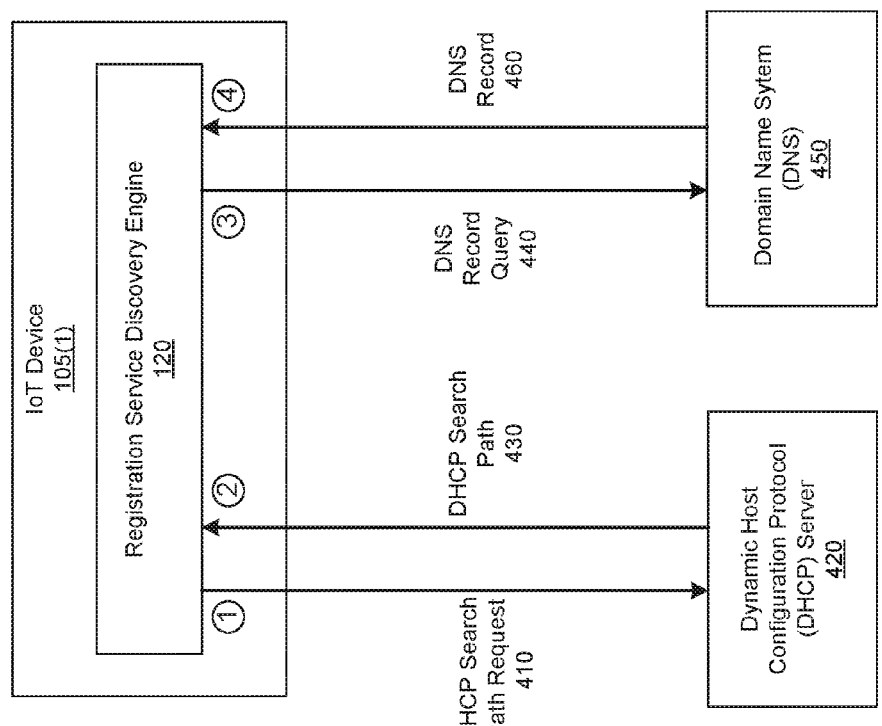
FIG. 4 illustrates how the Internet of Things (IoT) device of FIG. 1 identifies the registration service through a Domain Name System (DNS), according to various embodiments of the present invention.

FIG. 4 illustrates how the Internet of Things (IoT) device 105(1) of FIG. 1 identifies the registration service 130 through a Domain Name System (DNS) 450, according to various embodiments of the present invention. For explanatory purposes only, a sequence of events involved in an "discovery" process is depicted using numbered bubbles. In alternate embodiments, may modifications to the number of events, the sequence of events, and the events will be apparent to those of ordinary skill in the art without departing from the scope and spirit of the described embodiments.

First, as depicted with the bubble numbered "1," the registration service discovery engine 120 included in the IoT device 105(1) transmits a Dynamic Host Configuration Protocol (DHCP) search path request 410 to a DHCP server 420 associated with the network 175. As persons skilled in the art will recognize, DHCP is standardized network protocol in which a DHCP server dynamically distribute configuration parameters associated with a network. Among other things, the DHCP server 420 manages a pool of IP addresses and assigns IP addresses to entities on the network 175 on-demand. Further, the DHCP server 420 manages a DHCP search path 430. The DHCP search path 430 specifies a domain search list used when resolving domain names with the Domain Name System (DNS) 450.

As depicted with the bubble numbered "2," in response to the DHCP search path request 410, the DHCP server 420 transmits the DHCP search path 430 to the registration search discovery engine 120. The registration service discovery engine 120 then determines the parent domain name to which the IoT device 105 belongs based on the DHCP search path 430. In alternate embodiments, the registration service discovery engine 120 may determine the parent domain name in any technically feasible fashion. For example, in some embodiments, the registration service discovery engine 120 may determine the parent domain name to which the IoT device 105 belongs based on the domain name assigned to the IoT device 105 instead of using the DHCP search path 430.

More specifically, the registration service discovery engine 120 performs searches to discover the registration services 130 based on one or more search domains. For example, if the registration service discovery engine 120 receives the DHCP search path 430 from the DHCP server 420, then the registration service discovery engine 120 could base the searches on the domain names in the DHCP search path 430. In another example, if the registration service discovery engine 120 does not receive the DHCP search path 430 or is unable to discover the registration service 130 based on the DHCP search path 430, then the registration service discovery engine 120 could use the parent domain to discover the registration service 130.

Subsequently, as depicted with the bubble numbered "3," the registration service discovery engine 120 performs DNS Service Discovery (DNS-SD) to search for the registration service 130. As persons skilled in the art will recognize, DNS-SD is defined by the IETF (Internet Engineering Technology Taskforce) proposed standard 6763. A simplified description of DNS-SD is as follows. The registration service discovery engine 120 issues a DNS record query 440 to the DNS 450. The DNS record query 440 requests a text record (TXT) or service record (SRV) under a search domain name that specifies the identity of the registration service 130. In response to the DNS record query 440, as depicted with the bubble numbered "4," the registration service discover engine 120 receives a DNS record 450. Finally, the registration service discovery engine 120 identifies the registration service 130 based on the DNS record 460. In alternate embodiments, the registration service discovery engine 120 may request any type of resource records that serve a similar purpose to text records or service records in any technically feasible fashion.

As a general matter, the registration service discovery engine 120 may communicate with the DHCP server 420 and the DNS 450 in any technically feasible fashion. For example, the registration service discovery engine 120 may unicast the search path request 410 to the DHCP server 420. Further, the registration service discovery engine 120 may implement any number and type of security measures while communicating with the IoT device 105, the DHCP server 430, and the DNS 450.

Figure 5:
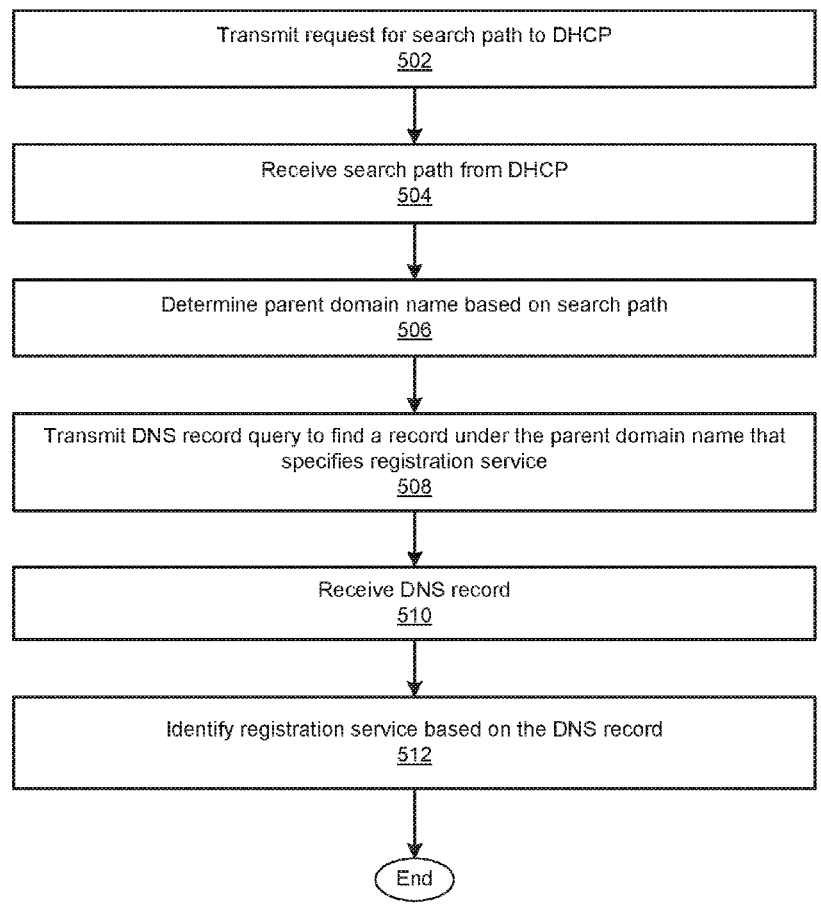
FIG. 5 is a flow diagram of method steps for identifying a registration service through a Domain Name System (DNS), according to various embodiments of the present invention.

FIG. 5 is a flow diagram of method steps for identifying a registration service through a Domain Name System (DNS), according to various embodiments of the present invention. Although the method steps are described with reference to the systems of FIGS. 1, 2, and 4, persons skilled in the art will understand that any system configured to implement the method steps, in any order, falls within the scope of the present invention. Please note that, for purposes of discussion only, it is assumed that the registration service discovery engine 120 included in the IoT device 105 initiates the security provisioning for the IoT device 105 when the IoT device 105 is first connected to the network 175. In alternate embodiments, the registration service discovery engine 120 may initiate the security provisioning for the IoT device 105 in response to any indirect or direct trigger. As a general matter, the IoT device 105 identifies the registration service 130 as part of automating the secure provisioning process for the IoT device 105.

In some embodiments, the techniques implemented in the registration service discovery engine 120 may be adapted to identifying any service that facilitates the provisioning of security functionality for the IoT device 105. For example, in some embodiments, the registration service discovery engine 120 may be replaced with a provisioning service discovery engine that identifies both the registration service 130 and the authorization authority 150 based on the techniques described herein for discovering the registration service 130.

As shown, a method 500 begins at step 502, where the registration service discovery engine 120 included in the IoT device 105 transmits the Dynamic Host Configuration Protocol (DHCP) search path request 410 to the DHCP server 420. At step 504, the registration service discovery engine 120 receives the DHCP search path 430 from the DHCP server 420. At step 506, the registration service discovery engine 120 determines the parent domain name to which the IoT device 105 belongs based on the DHCP search path 430. In alternate embodiments, the registration service discovery engine 120 may determine the parent domain name in any technically feasible fashion. For example, in some embodiments, instead of performing steps 502-506, the registration service discovery engine 120 may determine the parent domain name to which the IoT device 105 belongs based on the domain name assigned to the IoT device 105.

At step 508, the registration service discovery engine 120 issues the DNS record query 440 to the DNS 450. The DNS record query 440 requests a text record (TXT) or service record (SRV) under a search domain name that specifies the identity of the registration service 130. If the DNS search path contains multiple search domains, then the registration service discovery engine 120 queries each search domain in the DNS search path successively until a search successfully completes. At step 510, the registration service discovery engine 120 receives the requested DNS record 460. At step 512, the registration service discovery engine 120 identifies the registration service 130 based on the DNS record 460, and the method 500 terminates.

Establishing Verifiable Trust in Internet of Things (IoT) Devices

Figure 6:
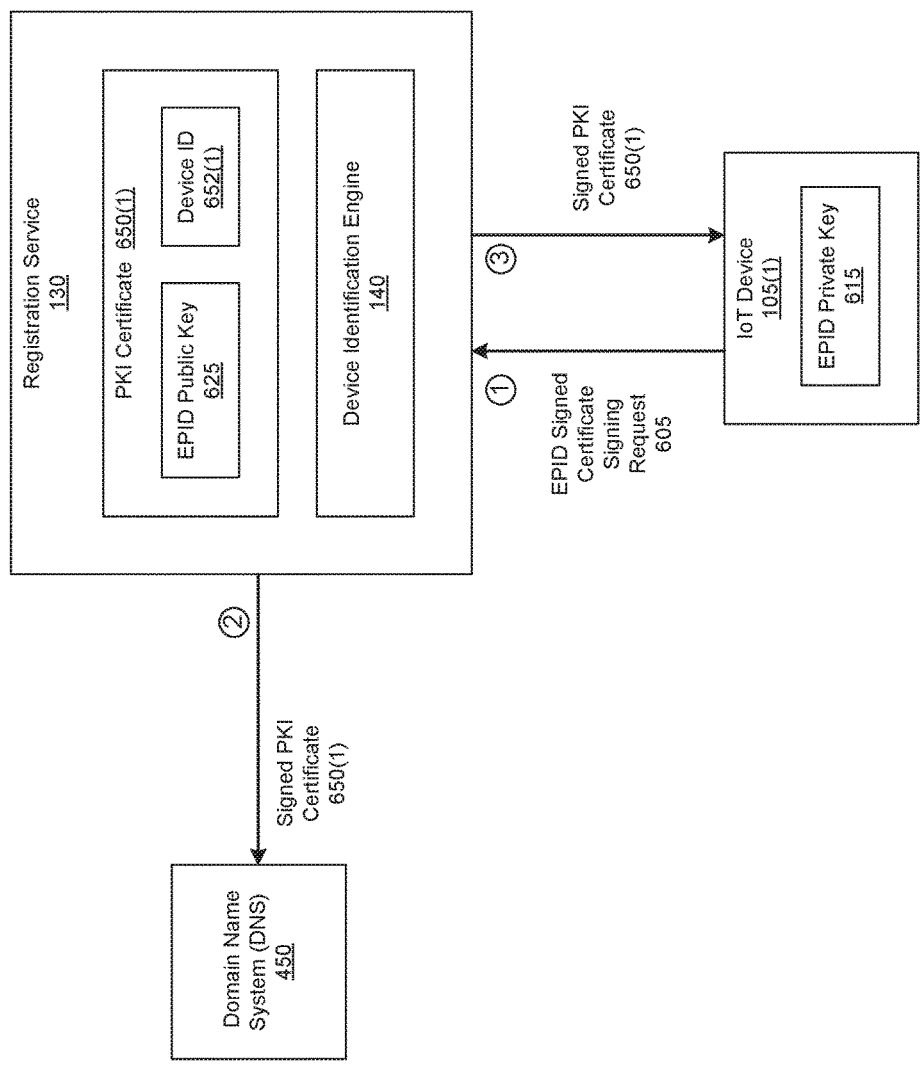
FIG. 6 illustrates how the registration service of FIG. 1 establishes a verifiable trust in an IoT device based on Enhanced Privacy Identification (EPID), according to various embodiments of the present invention.

FIG. 6 illustrates how the registration service 130 of FIG. 1 establishes a verifiable trust in the IoT device 105(1) based on Enhanced Privacy Identification (EPID), according to various embodiments of the present invention. As person skilled in the art will recognize, EPID is a digital signature algorithm that is based on a many to one private key to public key mapping. More specifically, each of any number of the IoT devices 105 may be associated with a unique EPID private key 615 and each of the EPID private keys 615 may be associated with a single EPID public key 625. EPID-based verification processes enable the IoT device 105 to provide some verifiable information associated with the IoT device 105 to other entities without necessarily providing a verifiable identity of the IoT device 105. Such verifiable information may include the type of the IoT device 105, the software that is running on the IoT device 105, and so forth.

For purposes of discussion only, the registration service 130 is trusted to generate key pairs, issue the PKI certificates 650, and perform EPID-based verification operations. In various embodiments, other techniques for generating key pairs and provisioning them onto the IoT device 105 may be used. For example, in some embodiments, the manufacturer of the IoT device 105 may generate a key pair and provision the key pair onto the IoT device 105 during the device manufacturing process. In another example, in some embodiments, the IoT device 105 may generate a key pair and provision the key pair onto the IoT device 105 as part of a device initialization process.

As a general matter, the IoT device 105(i) may identify the registration service 130 in any technically feasible fashion. For example, the IoT device 105(i) may identify the registration service 130 by polling other IoT devices 105 or querying the Domain Name System (DNS) 450. For explanatory purposes only, a sequence of events involved in an "authentication provisioning" process is depicted using numbered bubbles. In alternate embodiments, many modifications to the number of events, the sequence of events, and the events will be apparent to those of ordinary skill in the art without departing from the scope and spirit of the described embodiments.

First, as depicted with the bubble numbered "1," the IoT device 105(1) transmits an EPID signed certificate signing request (CSR) 605 to the registration service 130. The CSR 605 is a request for the generation of a PKI certificate 650(1) and, in the context of FIG. 6, the CSR is signed using the EPID private key 615 that is associated with the IoT device 105(1). As persons skilled in the art will recognize, prior to transmitting the EPID signed CSR 605 to the IoT device 105(1) is provisioned with the EPID private key 615. The IoT device 105(1) may be provisioned with the EPID private key 615 in any technically feasible fashion.

For example, in some embodiments, the manufacturer of the IoT device 105 may provision the EPID private key 615 onto the IoT device 105(1) during the device manufacturing process. In another example, in some embodiments, the IoT device 105 may provision the EPID private key 615 onto the IoT device 105 as part of a device initialization process. As a premise of EPID, the association of the EPID private key 615 with the IoT device 105(1) may be a private association that is not detectable by other IoT devices 105.

Upon receiving the CSR 605, the device identification engine 140 included in the registration service 130 performs verification operations. Notably, the device identification engine 140 uses the digital signature of the CSR 605 as a "verification" item. More specifically, to verify that the IoT device 105(i) is permitted to be provisioned on the network 175, the device identification engine 140 uses the EPID public key 615 to verify the digital signature of the CSR 605. The device identification engine 140 may obtain the EPID public key 625 in any technically feasible fashion. For example, in some embodiments, prior to receiving the CSR 605, the registration service 130 may receive the EPID public key 625 from a server that manages EPID for the manufacturer of the IoT device 105(1).

If the device identification engine 140 is unable to verify the digital signature of the CSR 605, then the registration service 130 terminates the authentication provisioning process. In such a scenario, the registration service 130 does not generate the PKI certificate 650(1). In some embodiments, the device identification engine 140 may transmit one or more error messages regarding an unsuccessful certificate generation request to any number of entities connected through the network 175, including the IoT device 105(1).

If, however, the device identification engine 140 successfully verifies the digital signature of the EPID signed CSR 605, then the device identification engine 140 generates the signed PKI certificate 650(1) associated with the IoT device 105(1). As shown, the PKI certificate 650(1) includes, without limitation, a device ID 652(1) associated with the IoT device 105 and the public key 655(1). The device identification engine 140 may generate the signed PKI certificate 650(1) in any technically feasible fashion.

For example, in some embodiments, the device identification engine 140 interacts with a certificate authority (CA) service to cause the CA service to generate and digitally sign the PKI certificate 650(1) using the private key 665 associated with the CA service. The other IoT devices 105 may subsequently verify the validity of the PKI certificate 650(1) using the public key 655 associated with the certificate authority service. More precisely, the other IoT devices 105 may confirm that the digital signature on the PKI certificate 650(1) was created by the certificate authority service using the public key 655 associated with the certificate authority service. Such IoT devices 105 may determine whether the certificate authority service is recognized as a trusted authority on the network 175 in any technically feasible fashion.

The device identification engine 140 then registers the IoT device 105 in the Domain Name System (DNS) 150. More specifically, as depicted with the bubble numbered "2," the device identification engine 140 transmits the signed PKI certificate 650(1) to an entity that manages a portion of the DNS 450. In alternate embodiments, the device identification engine 140 may register the IoT device 105 in the DNS 150, a device registry, or any other device registration system in any technically feasible fashion.

Finally, as depicted with the bubble numbered "3," the device identification engine 140 transmits the signed PKI certificate 650(i) to the IoT device 105(1). The device authentication engine 140 may transmit the signed PKI certificate 650(i) to the IoT device 105(1) using any technically feasible technique. For example, in some embodiments, because the signed PKI certificate 650(1) does not include confidential information, the device authentication engine 140 may transmit the signed PKI certificate 650(1) using a relatively insecure communication technique.

Figure 7:
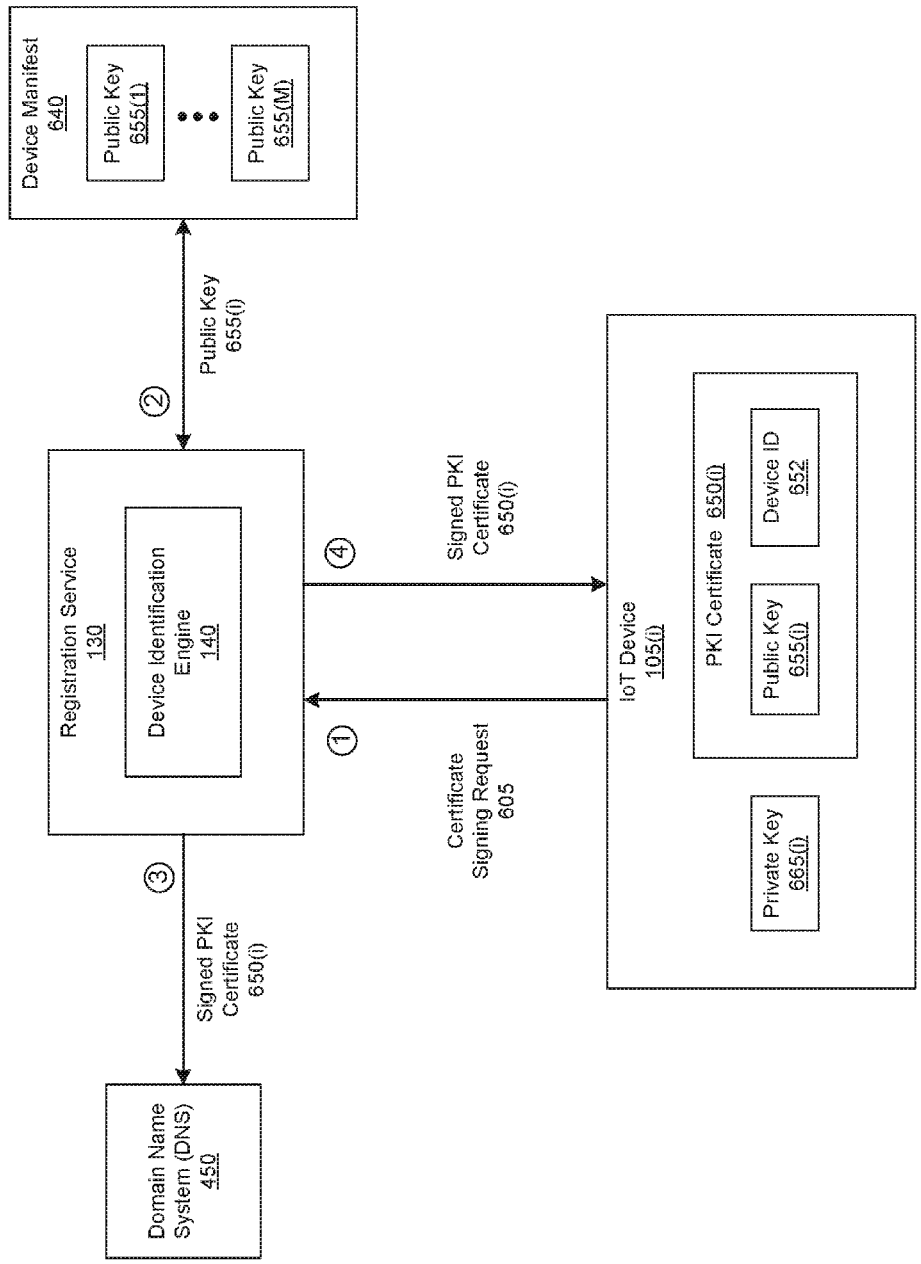
FIG. 7 illustrates how the registration service of FIG. 1 establishes a verifiable trust in an IoT device based on a certificate signing request (CSR), according to various embodiments of the present invention.

FIG. 7 illustrates how the registration service 130 of FIG. 1 establishes a verifiable trust in the IoT device 105(i) based on the certificate signing request (CSR) 605, according to various embodiments of the present invention. Please note that, for purposes of discussion only, the registration service 130 is trusted to generate key pairs and issue the PKI certificates 650. In various embodiments, other techniques for generating key pairs and provisioning them onto the IoT device 105(i) may be used. For example, in some embodiments, the manufacturer of the IoT device 105(i) may generate a key pair and provision the key pair onto the IoT device 105(i) during the device manufacturing process. In another example, in some embodiments, the IoT device 105(i) may generate a key pair and provision the key pair onto the IoT device 105(i) as part of a device initialization process.

As a general matter, the IoT device 105(i) may identify the registration service 130 in any technically feasible fashion. For example, the IoT device 105(i) may identify the registration service 130 by polling other IoT devices 105 or querying the Domain Name System (DNS) 450. For explanatory purposes only, a sequence of events involved in an "authentication provisioning" process is depicted using numbered bubbles. In alternate embodiments, many modifications to the number of events, the sequence of events, and the events will be apparent to those of ordinary skill in the art without departing from the scope and spirit of the described embodiments.

First, as depicted with the bubble numbered "1," the IoT device 105(i) transmits the certificate signing request (CSR) 605 to the registration service 130. In alternate embodiments, instead of transmitting the CSR 605 to the registration service 130, the IoT device 105(i) may transmit the information required to create the CSR 605 to the registration service 130 in any technically feasible fashion. In such embodiments, the registration service 130 creates the CSR 605 on behalf of the IoT device 105(i).

In alternate embodiments, as part of requesting that the registration service 130 generate the PKI certificate 650, the IoT device 105(i) may request that the registration service 130 generate a key pair that is associated with the IoT device 105(i). In such embodiments, as part of fulfilling the request, the registration service 130 may securely transmit the private key 665(i) included in the key pair to the IoT device 105(i). Upon receiving the private key 665(i), the IoT device 105(i) may store the private key 665(i) in private memory, such as the memory 116, that is associated with the IoT device 105(i).

The CSR 605 includes, without limitation, the public key 655(i) that is associated with the IoT device 105(i) and the device ID 652 that is associated with the IoT device 105(i). The public key 655(i) is part of a key pair that also includes a private key 665(i) that is stored in private memory, such as the memory 116, that is associated with the IoT device 105(i). In alternate embodiments (e.g., embodiments in which the registration process does not require creating the PKI certificate 650(i)), instead of transmitting the CSR 605 to the registration service 130, the IoT device 105(i) may transmit any technically feasible registration request that includes the required registration information. For example, suppose that the registration process involves creating a DNS DANE record containing the public key 655(i) that is associated with the IoT device 105(i). In such a scenario, the registration request could include, without limitation, the device ID 652, the public key 655(i), and a cryptographic signature on the registration request that is created using the private key 665(i) associated with the IoT device 105(i). In general, the information needed for registration may be provided to the registration service 130 in any technically feasible fashion.

For example, in some alternate embodiments, the certificate signing request 605 may include a device identifier certificate that was installed on the IoT device 105(i) by the manufacturer of the IoT device 105(i). The device identity certificate may contain an identifier for the manufacturer and a signature generated with the private key associated with the manufacturer. The device identity certificate may contain additional data, such as a device identifier or meta-data that classifies the type of device or meta-data that documents the date of manufacture. To verify the validity of the device identity certificate, the registration service 130 may verify the authenticity of the manufacturer's signature included in the certificate. If the registration service 130 successfully verifies the manufacturer's signature, then the registration service 130 may use other data contained in the device identity certificate to determine whether or not to continue processing the certificate signing request 605.

Upon receiving the CSR 605, the device identification engine 140 included in the registration service 130 reads the CSR 605 to determine the public key 655(i) that is associated with the IoT device 105(i). Notably, the public key 655(i) serves as a "verification" item that enables the device identification engine 140 to determine whether the IoT device 105(i) is permitted to be provisioned on the network 175. In operation, as depicted with the bubble numbered "2," the device identification engine 140 queries a device manifest 640 to determine whether the device manifest 640 includes the public key 655(i). The device identification engine 140 may execute the query in any technically feasible fashion. For example, in some embodiments, the device identification engine 140 may search the device manifest 640 for the public key 655(i).

The device manifest 640 includes, without limitation, any number of the public keys 655 associated with any number of the IoT devices 105 organized in any technically feasible fashion. The device manifest 640 may be stored in any memory device that is either directly or indirectly accessible to the device identification engine 140. The device manifest 640 may be generated in any technically feasible fashion. For example, and without limitation, entries included in the device manifest 640 could be sourced from bills of sale or other device acquisition-related documents. In alternate embodiments, the device manifest 640 may include any number and type of verification items organized in any technically feasible fashion that is consistent with the algorithms implemented in the device identification engine 140.

If the device identification engine 140 determines that the public key 655(i) is not included in the device manifest 640, then the registration service 130 terminates the authentication provisioning process. In such a scenario, the registration service 130 does not generate the PKI certificate 650(i). In some embodiments, the device identification engine 140 may transmit one or more error messages regarding the unsuccessful certificate signing request 605 to any number of entities connected through the network 175, including the IoT device 105(i).

If, however, the device identification engine 140 determines that the public key 655(i) is included in the device manifest 640, then the device identification engine 140 interacts with a certificate authority (CA) service to cause the CA service to generate and digitally sign the PKI certificate 650(i) using the private key 665 associated with the CA service. The other IoT devices 105 may subsequently verify the validity of the PKI certificate 650(i) using the public key 655 associated with the certificate authority service. More precisely, the other IoT devices 105 may confirm that the digital signature on the PKI certificate 650(i) was created by the certificate authority service using the public key 655 associated with the certificate authority service. Such IoT devices 105 may determine whether the certificate authority service is recognized as a trusted authority on the network 175 in any technically feasible fashion. In alternate embodiments, the device identification engine 140 may directly or indirectly generate the signed PKI certificate 650(i) in any technically feasible fashion.

The device identification engine 140 then register the IoT device 105 in the Domain Name System (DNS) 150. More specifically, as depicted with the bubble numbered "3," the device identification engine 140 transmits the signed PKI certificate 650(i) to an entity that manages a portion of the DNS 450. In alternate embodiments, the device identification engine 140 may register the IoT device 105 in the DNS 150 in accordance with the IETF DANE specification. In other embodiments, to register the IoT device 105 in the DNS 150, the device identification engine 140 may register the public key 144 associated with the IoT device 105 in the DNS 150. In yet other alternate embodiments, instead of registering the IoT device 105 in the DNS 105, the device identification engine 140 may register the IoT device 105 in any other device registration system in any technically feasible fashion. Finally, as depicted with the bubble numbered "4," the device identification engine 140 transmits the signed PKI certificate 650(i) to the IoT device 105(i).

Figure 8:
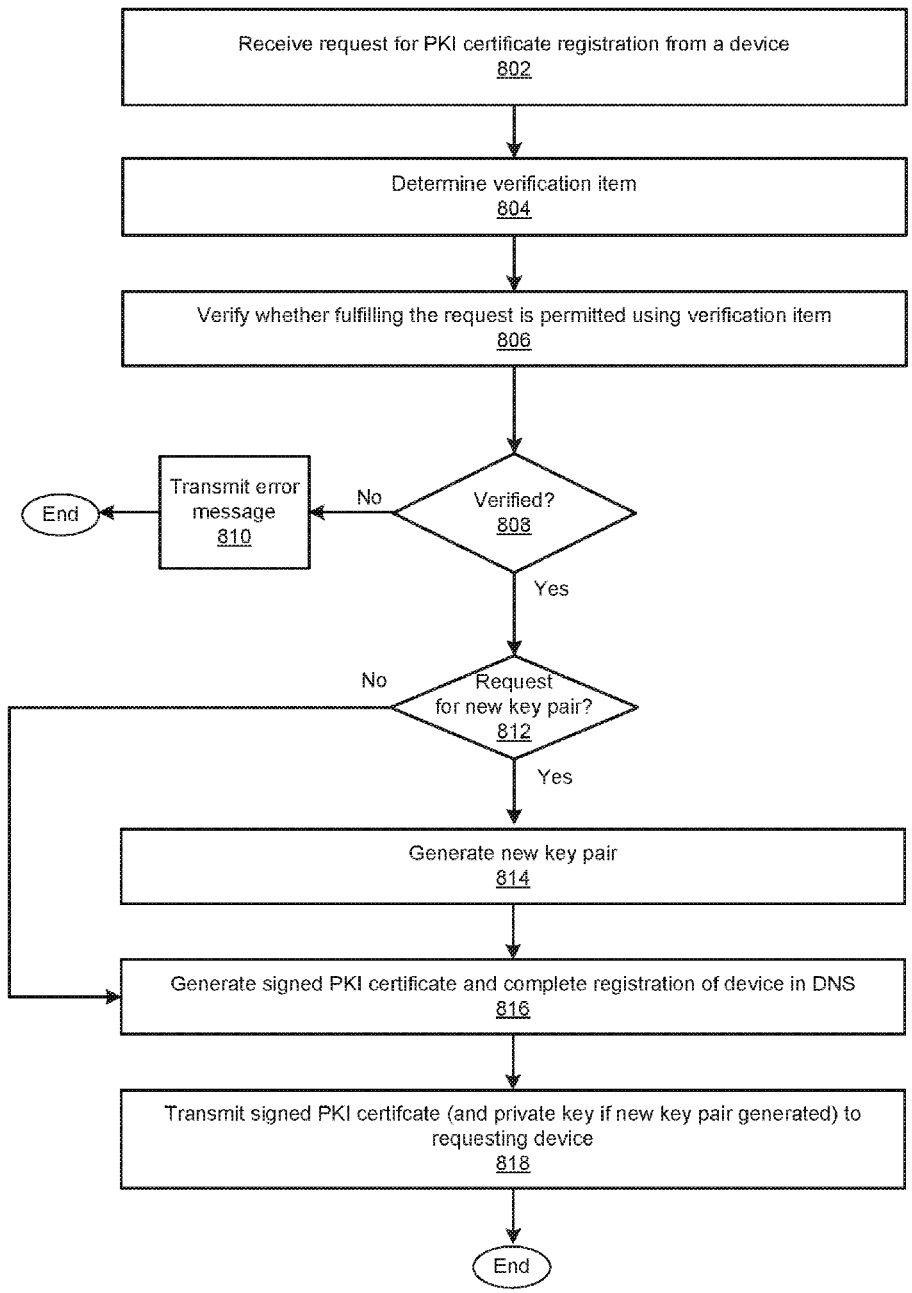
FIG. 8 is a flow diagram of method steps for establishing verifiable trust in an IoT device, according to various embodiments of the present invention.

FIG. 8 is a flow diagram of method steps for establishing verifiable trust in an IoT device, according to various embodiments of the present invention. Although the method steps are described with reference to the systems of FIGS. 1, 2, 4, 6, and 7, persons skilled in the art will understand that any system configured to implement the method steps, in any order, falls within the scope of the present invention. Please note that, for purposes of discussion only, the registration service 130 is trusted to generate key pairs and issue the PKI certificates 650. In various embodiments, other techniques for generating key pairs and provisioning them onto the IoT device 105 may be used.

For example, in some embodiments, the manufacturer of the IoT device 105 may generate a key pair and provision the key pair onto the IoT device 105 during the device manufacturing process. In another example, in some embodiments, the IoT device 105 may generate a key pair and provision the key pair onto the IoT device 105 as part of a device initialization process. As a general matter, the IoT device 105 may identify the registration service 130 in any technically feasible fashion. For example, the IoT device 105 may identify the registration service 130 by polling other IoT devices 105 or querying the Domain Name System (DNS) 450.

As shown, a method 800 begins at step 802, where the registration service 130 receives a certificate signing request (CSR) 605 for the IoT device 105. In alternate embodiments, the registration service 130 may receive any type of request for performing any number of operations involved in the registration provisioning process and may include any relevant information. In some embodiments, the request may be the EPID signed CSR 605. As described previously in FIG. 6, the EPID signed CSR 605 is signed using the EPID private key 615 associated with the IoT device 105.

At step 804, the device identification engine 140 included in the registration service 130 determines a verification item that is associated with the IoT device 105. The verification item may be any characteristic, object, or property associated with the IoT device 105 that is consistent with determining that the IoT device 105 is permitted to be provisioned on the network 175. Further, the device identification engine 140 may determine the verification item in any technically feasible fashion. For example, if the request is the EPID signed CSR 605, then the verification item could be the digital signature. By contrast, the verification item could be the public key 655(i) included in the CSR 605.

At step 806, the device identification engine 140 performs one or more verification operations based on the verification item. As a general matter, the device identification engine 140 may perform any number and type of operations that involve assessing the verification item using trustworthy information. For example, if the verification item is a digital signature created using the EPID private key 615, then the device identification engine 140 could attempt to verify the digital signature using the EPID public key 625 corresponding to the EPID private key 615. In another example, if the verification item is the public key 655(i), then the device identification engine 140 could search the device manifest 640 of public keys 655 that are authorized to be provisioned on the network 175 for the public key 655(i).

In yet another example, if the verification item is a digital signature created using the private key 665 associated with the IoT device 105, then the device identification engine 140 could search the device manifest 640 for the public key 655 that is associated with the IoT device 105. Subsequently, if the device identification engine 140 identifies that the public key 655 associated with the IoT device 105 is included in the device manifest 640, then the device identification engine 140 could attempt to verify the digital signature using the identified public key 655 associated with the IoT device 105.

At step 808, the device identification engine 140 determines whether the device identification engine 140 has sufficiently verified that provisioning the IoT device 105 is permitted. If, at step 808, the device identification engine 140 has not sufficiently verified that provisioning the IoT device 105 is permitted, then the method 800 proceeds to step 810. At step 810, the registration service 130 transmits an error message that indicates that an unsuccessful attempt has been made to provision the IoT device 105. The registration service 130 may transmit the error message in any technically feasible fashion to any entity connected through the network 175. For example, the registration service 130 may unicast the error message to the IoT device 105 or a software application used to monitor and/or control the IoT devices 105. In another example, the registration service 130 may multicast the error messages to all the IoT devices 105 to alert the IoT devices 105 to a possible attempt to breach the security of the network 175. In alternate embodiments, the registration service 130 may not transmit any error messages associated with the unsuccessful attempt to provision the IoT device 105 and, therefore, the registration service 130 may not perform step 810. The method 800 then terminates.

If, however, at step 808, the device identification engine 140 has sufficiently verified that provisioning the IoT device 105 is permitted, then the method 800 proceeds directly to step 812. At step 812, the device identification engine 140 determines whether the request involves generating a new key pair. For example, if the request is the EPID signed certificate signing request 605, then the request typically would not involve generating a new key pair. By contrast, if the request is the certificate signing request 605 that is not signed using the EPID private key 615, then the request could involve generating a new key pair. If, at step 812, the device identification engine 140 determines that the request involves generating a new key pair, then the method 800 proceeds to step 814. At step 814, the device identification engine 140 generates a new key pair. The device identification engine 140 may generate the new key pair in any technically feasible fashion.

If, however, at step 812, the device identification engine 140 determines that the request does not involve generating a new key pair, then the method 800 proceeds directly to step 816. At step 816, the device identification engine 140 generates the signed PKI certificate 650. the device identification engine 140 may generate the signed PKI certificate 650 in any technically feasible fashion. For example, in some embodiments, the device identification engine 140 interacts with a certificate authority (CA) service to cause the CA service to generate and digitally sign the PKI certificate 650 using the private key 665 associated with the CA service. The other IoT devices 105 may subsequently verify the validity of the PKI certificate 650 using the public key 655 associated with the certificate authority service. More precisely, the other IoT devices 105 may confirm that the digital signature on the PKI certificate 650 was created by the certificate authority service using the public key 655 associated with the certificate authority service. Such IoT devices 105 may determine whether the certificate authority service is recognized as a trusted authority on the network 175 in any technically feasible fashion.

In some embodiments, as part of step 816, the device identification engine 140 may also complete the registration of the IoT device 105 in the Domain Name System (DNS) 150. The device identification engine 140 may complete the registration in any technically feasible fashion. For example, the device identification engine 140 may transmit the signed PKI certificate 650 or the public key 655 associated with the IoT device 105 to an entity that manages a portion of the DNS 450. In alternate embodiments, the device identification engine 140 may execute any number of operations to provide further assurance that the PKI certificate 650 is trustworthy. For example, in some embodiments, the device identification engine 150 may complete the registration of the IoT device 105 into the DNS 450 in accordance with the IETF DANE proposed standard. In yet other embodiments, the device identification engine 140 may insert the PKI certificate 650 into a device registry.

At step 818, the device identification engine 140 transmits the signed PKI certificate 650 to the IoT device 105. If the device identification engine 140 generated the new key pair, then the device identification engine 140 also securely transmits the private key 655 included in the new key pair to the IoT device 105. The device identification engine 150 may transmit the signed PKI certificate 650 and/or the private key 655 in any technically feasible fashion and include any amount of information to verify the identity of the registration service 130. The method 800 then terminates.

Generating Authorization Credentials

Figure 9:
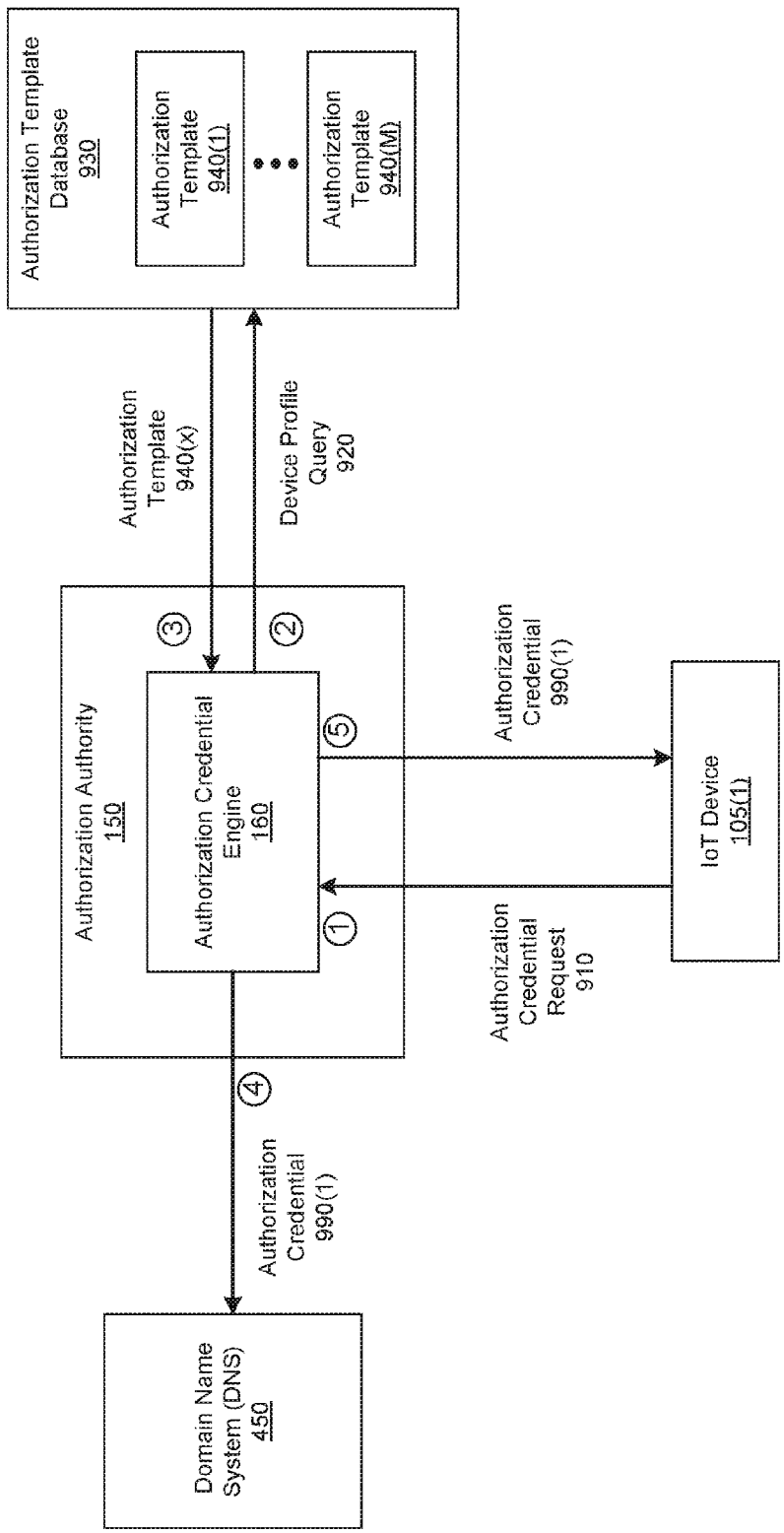
FIG. 9 illustrates how the authorization authority of FIG. 1 generates an authorization credential for an IoT device, according to various embodiments of the present invention.

FIG. 9 illustrates how the authorization authority 150 of FIG. 1 generates an authorization credential 990(1) for the IoT device 105(1), according to various embodiments of the present invention. For explanatory purposes only, a sequence of events involved in an "authorization provisioning" process is depicted using numbered bubbles. In alternate embodiments, many modifications to the number of events, the sequence of events, and the events will be apparent to those of ordinary skill in the art without departing from the scope and spirit of the described embodiments.

First, as depicted with the bubble numbered "1," the IoT device 105(1) transmits an authorization credential request 910 to the authorization authority 150. The authorization credential request 910 includes identifying information for the IoT device 105(i) and requests the authorization credential 990(1) for the IoT device 105(i). Upon receiving the authorization credential request 910, the authorization credential engine 160 verifies the identity of the IoT device 105(1). The authorization credential engine 160 may verify the identify of the IoT device 105(1) in any technically feasible fashion.

For example, in some embodiments, the authorization authority 150 and the IoT device 105(1) cryptographically sign and exchange messages so that the identity of each of the authorization authority 150 and the IoT device 105(1) can be verified by the other. In other embodiments, the authorization authority 150 and the IoT device 105(1) may exchange messages containing the PKI certificates 650 to mutually verify identities. More specifically, the authorization authority 150 and the IoT device 105(1) may use the public keys 655 included in the PKI certificates 650 to verify signatures on messages from the other entity. In other embodiments, the authorization authority 150 may implement the device identification engine 140, and the device identification engine 140 may execute the method steps described previously in FIG. 6 to establish trust in the IoT device 105(1).

If the authorization credential engine 160 is unable to verify the identity of the IoT device 105(1), then the authorization credential engine 160 terminates the authorization provisioning process. In such a scenario, the authorization credential engine 160 does not generate the authorization credential 990(1) associated with the IoT device 105(1). Consequently, other IoT devices 105 that implement basic security functionality may be configured to prohibit interactions with the IoT device 105(1). Further, in some embodiments, the authorization credential engine 160 may transmit one or more error messages regarding the unsuccessful authorization credential request 910.

For example, the authorization credential engine 160 may unicast an error message that indicates the type of verification attempt that was unsuccessful to the IoT device 105(1). In some embodiments, the authorization credential engine 160 may perform preemptive actions to protect the other IoT devices 105 from unauthorized accesses as well as the privacy of data communicated between the IoT device 105 through the network 175. For example, the authorization credential engine 160 may unicast or broadcast a message to entities connected through the network 175 that alerts the entities to a possible attempt to breach the security of the network 175. Such entities may include, without limitation, one or more software applications used to monitor and/or control the IoT devices 105, any number of the other IoT devices 105, and so forth.

If, however, the authorization credential engine 160 successfully verifies the identity of the IoT device 105(1), then the authorization credential engine 160 determines distinguishing information that is associated with the IoT device 105(1). The distinguishing information may include number and type of items or characteristics associated with the IoT device 105(1) and/or the authorization credential request 910. Further, the authorization credential engine 160 may determine the distinguishing information in any technically feasible fashion. For example, in some embodiments the authorization credential engine 160 may read the PKI certificate 650 associated with the IoT device 105 to determine the distinguishing information. In other embodiments, the distinguishing information may be the Enhanced Privacy Identification (EPID) public key 625. In yet other embodiments, the distinguishing information may be or a function of the IoT device 105(1) on the network 175 or a device type (e.g., controller).

As depicted with the bubble numbered "2," after determining the distinguishing information, the authorization credential engine 160 performs a device profile query 920 into an authorization template database 930. The authorization template database 930 includes, without limitation, any number of authorization templates 940. The device profile query 920 performs matching operations between the distinguishing information and device profiles (not shown) included in the authorization template database 940. Each device profile is associated with one or more of the authorization templates 940. Each of the authorization templates 940 includes one or more authorizations that specify types of interactions that are permitted for the IoT devices 150 that match the corresponding device profile.

As depicted with the bubble numbered "3," the authorization credential engine 160 then selects the authorization templates 940(x) included in the authorization template database 930 based on the matching device profiles. If the authorization credential engine 160 does not select a device profile or does not select any of the authorization templates 940, then the authorization credential engine 160 terminates the authorization provisioning process. In such a scenario, the authorization credential engine 160 does not generate the authorization credential 990 associated with the IoT device 105(1). In some embodiments, the authorization credential engine 160 may transmit one or more error messages regarding the unsuccessful authorization credential request 910 to any number of entities connected through the network 175.

If, however, the authorization credential engine 160 selects one or more of the authorization templates, then the authorization credential engine 160 generates the authorization credential 990(1) based on the selected authorization templates 940(x). The authorization credential 990(1) identifies the IoT device 105(1) and specifies the authorizations granted for the IoT device 105(1). In operation, the authorization credential engine 160 determines the authorization granted for the IoT device 105(1) as the union of all the authorizations included in the selected authorization templates 940(x). In alternate embodiments, the authorization credential engine 160 may implement any type and number of algorithms to determine the authorizations applicable to the IoT device 105 based on any type and amount of distinguishing information. Further, the authorization template database 930 may be implemented in any technically feasible fashion that is consistent with such algorithms and the distinguishing information.

After the authorization credential engine 160 generates the authorization credential 990(1), the authorization authority 150 cryptographically signs the authorization credential 990(1) using the private key 665 associated with the authorization credential engine 160. Other IoT devices 105 may subsequently verify the validity of the authorization credential 990(1) by confirming that the digital signature on the authorization credential 990(1) was created by the authorization authority 150. More precisely, other IoT devices 105 may use the public key 655 that is associated with the authorization authority 150 to verify the digital signature. In alternate embodiments, the authorization credential engine 160 may generate a digital signature in any technically feasible fashion based on any security protocol as known in the art. In other alternate embodiments, instead of signing the authorization credential 990(1), the authorization credential engine 160 may perform any number and type of operations to provide assurance that the authorization credential engine 160 generated the authorization credential 990(1).

After signing the authorization credential 990(1), the authorization authority 150 inserts the authorization credential 990(1) into the DNS 450. The authorization authority 150 may insert the authorization credential 990 into the DNS 450 in any technically feasible fashion. For example, in some embodiments and as depicted with the bubble numbered "4," the authorization authority 150 may transmit the authorization credential 990(1) to an entity that manages a portion of the DNS 450. In other alternate embodiments, the authorization authority 150 may not insert the authorization credential 990 into the DNS 450 and may execute any number, including zero, of operations to provide further assurance that the authorization credential 990(1) is trustworthy.

In alternate embodiments, the authorization authority 150 may not install the authorization credential 990 into the DNS 450. In such embodiments, the authorization authority 150 would provide the authorization credential 990 to the IoT device 105. Subsequently, the IoT device 105 would provide the authorization credential 990 to entities with which the IoT device 105 is interacting. The IoT device 105 would provide the authorization credential 990 as part of a message signed by the IoT device 105. An entity receiving such a message could verify the signature of the IoT device 105 using methods defined herein. The receiving entity could verify the signature of the authorization authority 150 on the authorization credential 990 using any technically feasible technique. For example, the receiving entity could verify the signature of the authorization authority 150 on the authorization credential 990 using the public key 655 included in a certificate of the authorization authority 150. In another example, the receiving entity could verify the signature of the authorization authority 150 on the authorization credential 990 using the public key 655 public key extracted from a record for the authorization authority 150 found in the DNS 450.

Finally, as depicted with the bubble numbered "5," the authorization authority 150 transmits the authorization credential 990(1) to the IoT device 105 for installation onto the IoT device 105. The IoT device 105(1) may install the authorization credential 990(1) in any technically feasible fashion. For example, the IoT device 105(1) may store the authorization credential 990(1) in the memory 116 and prevent any other IoT device 105 from reading the memory 116.

Figure 10:
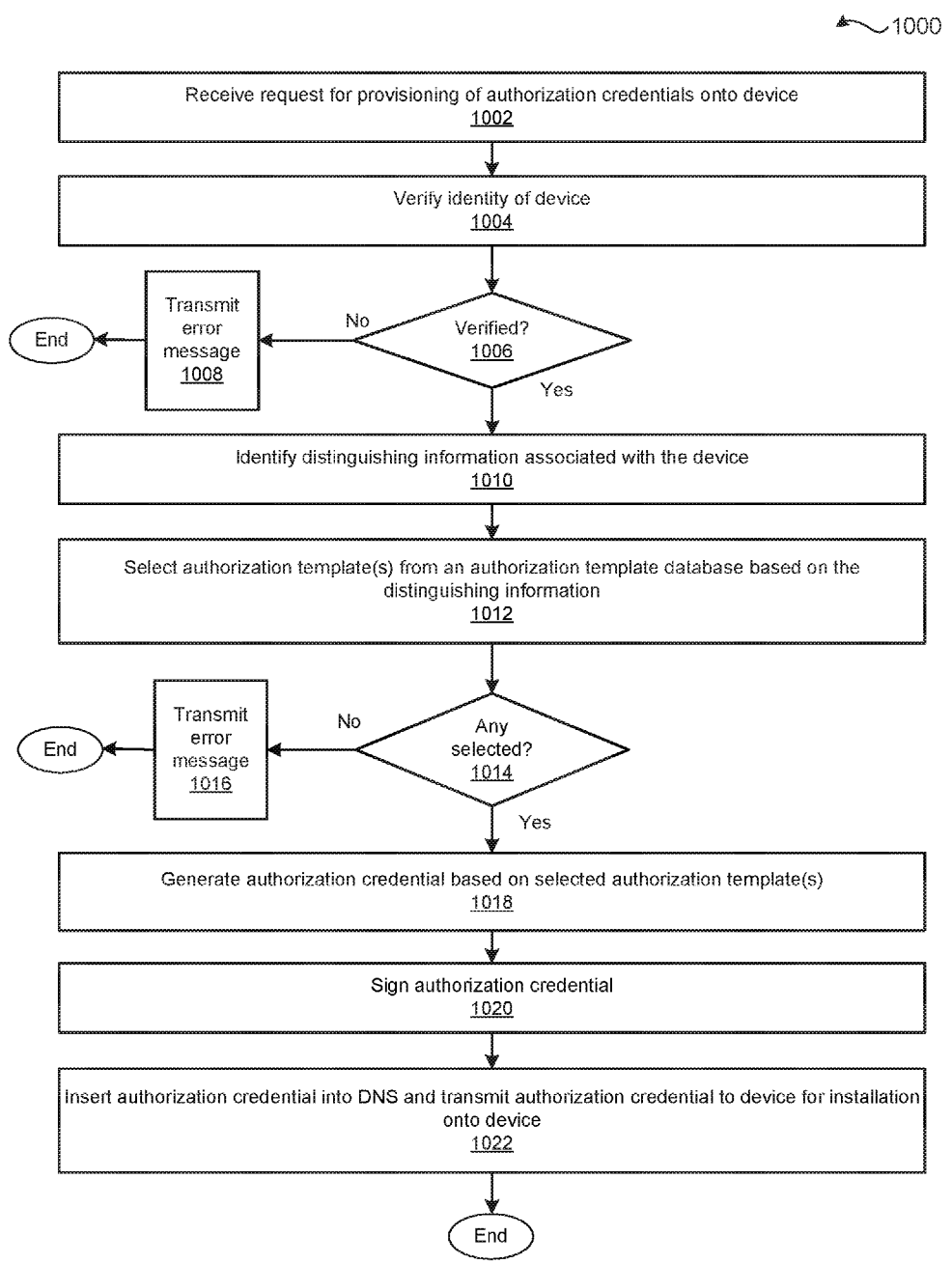
FIG. 10 is a flow diagram of method steps for generating an authorization credential for an IoT device, according to various embodiments of the present invention.

FIG. 10 is a flow diagram of method steps for generating an authorization credential for an IoT device, according to various embodiments of the present invention. Although the method steps are described with reference to the systems of FIGS. 1,2,4,6,7, and 9 persons skilled in the art will understand that any system configured to implement the method steps, in any order, falls within the scope of the present invention. Please note that, for purposes of discussion only, the authorization authority 150 is trusted to set the authorizations for the IoT devices 105 and issue the authorization credentials 990. As a general matter, the IoT device 105 may identify the authorization authority 150 in any technically feasible fashion. For example, the IoT device 105 may identify the authorization authority 150 by polling the other IoT devices 105 or querying the Domain Name Service (DNS) 450.

As shown, a method 1000 begins at step 1002, where the authorization authority 150 receives an authorization credential request 910 for provisioning the authorization credentials 990 onto the IoT device 105. At step 1004, the authorization credential engine 160 included in the authorization authority 150 verifies the identity of the IoT device 105. The authorization credential engine 160 may verify the identify of the IoT device 105 in any technically feasible fashion. For example, in some embodiments, the authorization authority 150 may implement the device identification engine 140, and the device identification engine 140 may execute the method steps described previously in FIG. 6 to establish trust in the IoT device 105. In other embodiments, the IoT device 105 may provide the PKI certificate 650 associated with the IoT device 105 that the IoT device 105 previously obtained from the registration service 130.

At step 1006, the authorization credential engine 160 determines whether the identity of the IoT device 105 is sufficiently verified. If, at step 1006, the authorization credential engine 160 determines that the identity of the IoT device 105 has not been sufficiently verified, then the method 1000 proceeds to step 1008. At step 1008, the authorization credential engine 160 transmits an error message that indicates that an unsuccessful attempt has been made to provision the IoT device 105. The authorization authority 150 may transmit the error message in any technically feasible fashion to any entity connected through the network 175. For example, the authorization credential engine 160 may unicast the error message to the IoT device 105 or a software application used to monitor and/or control the IoT devices 105. In another example, the authorization authority 150 may multicast the error messages to all the IoT devices 105 to alert the IoT devices 105 to a possible attempt to breach the security of the network 175. In alternate embodiments, the authorization credential engine 160 may implement any number of error handling operations, including zero, instead of or in addition to transmitting the error message. The method 1000 then terminates.

If, however, at step 1006, the authorization credential engine 160 determines that the identity of the IoT device 105 has been sufficiently verified, then the method 1000 proceeds directly to step 1010. At step 1010, the authorization credential engine 160 identifies distinguishing information that is associated with the IoT device 105. The distinguishing information may be any information that is consistent with distinguishing between the authorization templates 940 included in the authorization template database 930. More specifically, the distinguishing item may be any item that enables the authorization authority engine 150 to identify the authorization templates 940 included in the authorization template database 930 that are applicable to the IoT device 105. For example, in some embodiments, the distinguishing information may be the Enhanced Privacy Identification (EPID) public key 625. Further, the authorization credential engine 160 may identify the distinguishing information in any technically feasible fashion.

At step 1012, the authorization credential engine 160 performs matching operations between the distinguishing information and device profiles included in the authorization template database 930. Each device profile is associated with one or more of the authorization templates 940. The authorization credential engine 160 selects the authorization templates 940 included in the authorization template database 930 based on the matching device profiles. In alternate embodiments, the authorization credential engine 160 may implement any type and number of algorithms to determine the authorizations applicable to the IoT device 105 based on any type and amount of distinguishing information. At step 1014, the authorization credential engine 160 determines whether the authorization credential engine 160 has selected any of the authorization templates 940.

If, at step 1014, the authorization credential engine 160 has not selected any of the authorization templates 940, then the method 1000 proceeds to step 1016. At step 1016, the authorization credential engine 160 transmits an error message that indicates that an unsuccessful attempt has been made to provision the IoT device 105. The authorization authority 150 may transmit the error message in any technically feasible fashion to any entity connected through the network 175. The method 1000 then terminates.

If, however, at step 1014, the authorization credential engine 160 has selected one or more of the authorization templates 940, then the method 1000 proceeds directly to step 1018. At step 1018, the authorization credential engine 160 generates the authorization credential 990 associated with the IoT device 105 based on the selected authorization templates 940. More specifically, the authorization credential engine 160 generates a digital document that includes authorization data that specifies what actions may be taken by the IoT device 105 in interactions with other IoT devices 105 over the network 175.

The authorization credential engine 160 may generate the authorization credential 990 in any technically feasible fashion. For example, in some embodiments, the authorization credential engine 160 may compute a union of all the authorizations included in the selected authorization credentials 990. The authorization credential engine 160 may then generate the authorization credential 990 that specifies the identity of the IoT device 105 and this union of authorizations. In other embodiments, the authorization credential engine 160 may include any number of authorizations included in any number of the selected authorization templates 940 in the authorization credential 160 using any technically feasible selection algorithm.

At step 1012, the authorization authority 150 digitally signs the authorization credential 990. Other IoT devices 105 may subsequently verify the validity of the authorization credential 990 by confirming that the digital signature on the authorization credential 990 was created by the authorization authority 150. For example, in some embodiments, the authorization authority 150 may sign the authorization credential 990 using the private key 665 associated with the authorization authority 150. Subsequently, other IoT devices 105 may cryptographically verify the digital signature using the public key 655 associated with the authorization authority 150. Such IoT devices 105 may determine whether the authorization authority 150 is recognized as a trusted authority on the network 175 in any technically feasible fashion.

At step 1022, the authorization authority 150 installs the authorization credential 990 in the Domain Name System (DNS) 450 and transmits the authorization credential 990 to the IoT device 105 for installation onto the IoT device 105. The authorization authority 150 may install the authorization credential 990 into the DNS 450 in any technically feasible fashion. For example, in some embodiments, the authorization authority 150 may transmit the authorization credential 990 to an entity that manages a portion of the DNS 450. The method 1000 then terminates.

In alternate embodiments, the authorization authority 150 may not install the authorization credential 990 into the DNS 450. In such embodiments, the authorization authority 150 would provide the authorization credential 990 to the IoT device 105. Subsequently, the IoT device 105 would provide the authorization credential 990 to entities with which the IoT device 105 is interacting. The IoT device 105 would provide the authorization credential 990 as part of a message signed by the IoT device 105. An entity receiving such a message could verify the signature of the IoT device 105 using methods defined herein. The receiving entity could verify the signature of the authorization authority 150 on the authorization credential 990 using any technically feasible technique. For example, the receiving entity could verify the signature of the authorization authority 150 on the authorization credential 990 using the public key 655 included in a certificate of the authorization authority 150. In another example, the receiving entity could verify the signature of the authorization authority 150 on the authorization credential 990 using the public key 655 public key extracted from a record for the authorization authority 150 found in the DNS 450.

Integrating Security Provisioning Techniques

Note that the techniques described herein are illustrative rather than restrictive, and may be altered without departing from the broader spirit and scope of the invention. For example, in various embodiments, any number of the techniques may be combined in any technically feasible fashion to increase the overall security of the provisioning process. Many such modifications and variations on the functionality provided by the registration service identification engine 120, the device identification engine 140, and/or the authorization credential engine 160 will be apparent to those of ordinary skill in the art without departing from the scope and spirit of the described embodiments.

In one example of combining functionality, in some embodiments, the IoT device 105 implements the registration service discovery engine 120. The registration service discovery engine 120 identifies the registration service 130 and the authorization authority 150 using a multicast. As part of the discovery process, the registration service discovery engine receives the registration service ID responses 220 from the other IoT devices 105 connected through the network 175. Subsequently, as part of a registration request, the IoT device 105 submits the registration service ID responses 220 to the registration service 130. In response, the device identification engine 140 evaluates the registration service ID responses 220 to verify whether the IoT device 220 is permitted to be provisioned on the network 175. The IoT device 105 then submits the registration service ID responses 220 to the authorization authority 150 as part of the authorization credential request 910. In response, the authorization credential engine 160 evaluates the registration service ID responses 220 to determine whether the identification of the IoT device 220 reliable. In this fashion, different techniques described herein combine to create a unified, automated, and secure provisioning process.

In sum, the disclosed techniques may be used to automate security provisioning for devices. When first connected to a network, a device broadcasts to the network a request for the identity of the desired type of provisioning service. Other devices connected through the network respond back to the requesting device with the identity of the provisioning service. The requesting device then evaluates the responses to determine whether a provisioning service has been sufficiently identified. If the requesting device determines that a provisioning service has been sufficiently identified, then the requesting device interacts with the identified services to provision the requesting device.

In response to a provisioning request for a device, a provisioning service establishes trust in the device as a prerequisite to performing the provisioning request. First, the provisioning service identifies an authentication item that is associated with the provisioning request. Subsequently, the provisioning service performs verification operations based on the authentication item. For example, if the authentication item is a digital signature that is signed using an EPID private key, then the provisioning service may validate the digital signature using a corresponding EPID public key. If the provisioning service successfully validates the authentication item, then the provisioning service performs the requested provisioning request. If, however, the provisioning service is unable to validate the authentication item, then the provisioning service transmits an error message that alerts security monitoring services to potentially malicious activity.

Subsequently, a provisioning service that is a valid issuer of authorization credentials automatically defines authorizations for devices. In operation, a device transmits a request to an "authentication authority" to grant authorizations for the device. In response, the authorization authority selects one or more matching authorization templates from a set of authorization templates based on distinguishing information associated with the device. The authorization authority then determines the applicable authorizations for the device based on the selected authorization templates. Subsequently, the authorization authority generates an authorization credential that specifies the determined authorizations and transmits the authorization credential to the device for installation onto the device.

Advantageously, by enabling the automation of authentication and authorization provisioning, the techniques described herein enable efficient security provisioning for devices. In particular, automatically discovering provisioning services and automatically establishing trust in devices supersede manual authentication provisioning activities for the devices. Further, generating authorization credentials for devices based on template matching algorithms replaces manually-based authorization credential creation. Reducing the time, cost, and expertise required to perform security provisioning for devices encourages widespread adoption of secure authentication, encryption, and authorization services. Increasing the adoption of such services increases the overall security of interacting through networks, such as those included in the Internet.

1. In some embodiments, a method for establishing trust in a device when provisioning the device comprises receiving a provisioning request associated with the device; determining a verification item based on the provisioning request; determining, via a processor, that one or more provisioning operations are authorized based on the verification item; and performing the one or more provisioning operations to establish a verifiable identification for the device.

The method of clause 1, wherein the verification item comprises a digital signature, and determining that one or more provisioning operations are authorized comprises identifying a public key that is associated with the digital signature; and validating the digital signature based on the public key.

3. The method of clauses 1 or 2, wherein the digital signature is generated using an Enhanced Privacy Identification (EPID) private key, and identifying the public key comprises selecting a EPID public key that is associated with the EPID private key.

4. The method of any of clauses 1-3, wherein the digital signature is generated using a private key, and identifying the public key comprises performing one or more look up operations on a device manifest based on a name of the device, wherein the device manifest includes a plurality of public keys.

5. The method of any of clauses 1-4, wherein determining that one or more provisioning operations are authorized comprises performing one or more look up operations on a device manifest based on the verification item.

6. The method of any of clauses 1-5, wherein the verification item comprises an Internet Protocol (IP) number, a domain name, or a certificate that includes a public key.

7. The method of any of clauses 1-6, wherein performing the one or more provisioning operations comprises storing the public key in a Domain Name System (DNS) based on a name of the device.

8. The method of any of clauses 1-7, wherein performing the one or more provisioning operations comprises signing a certificate that includes a public key to generate a signed certificate; storing the public key in a Domain Name System (DNS) based on a name of the device; and transmitting the signed certificate to the device.

9. In some embodiments, a computer-readable storage medium includes instructions that, when executed by a processor, cause the processor to perform the steps of determining distinguishing information associated with a first device in response to a first provisioning request; selecting at least one authorization template included in a template database based on the distinguishing information; and generating a first authorization credential for the first device based on the at least one authorization template.

10. The computer-readable storage medium of clause 9, wherein the distinguishing information comprises an Internet Protocol (IP) number, a domain name, an Enhanced Privacy Identification (EPID) public key, or a device type.

11. The computer-readable storage medium of clauses 9 or 10, wherein the distinguishing information comprises a public key, and determining the distinguishing information comprises reading a public key infrastructure (PKI) certificate that includes the public key.

12. The computer-readable storage medium of any of clauses 9-11, further comprising signing the first authorization credential to generate a signed authorization credential; and transmitting the signed authorization credential to the first device.

13. The computer-readable storage medium of any of clauses 9-12, further comprising inserting the signed authorization credential into a Domain Name System (DNS).

14. The computer-readable storage medium of any of clauses 9-13, further comprising receiving a second provisioning request for a second device; performing one or more verification operations to determine whether an identification associated with the second device is reliable; and if the identification is reliable, then generating a second authorization credential for the second device based on a first template that is not included in the at least one authorization template, or if the identification is not reliable, then transmitting an error message to at least one of the first device and the second device.

15. The computer-readable storage medium of any of clauses 9-14, wherein selecting the at least one authorization template comprises performing one or more matching operations between the distinguishing information and a plurality of device profiles, wherein each device profile included in the plurality of device profiles is associated with one or more authorization templates included in the template database.

16. The computer-readable storage medium of any of clauses 9-15, wherein generating the first authorization credential comprises creating a union of all authorizations included in the at least one authorization template that are applicable to the first device.

17. In some embodiments, a system comprises a memory storing a provisioning engine; and a processor that is coupled to the memory and, when executing the provisioning engine, is configured to receive a provisioning request associated with a device; determine a verification item based on the provisioning request; determine that one or more provisioning operations are authorized based on the verification item; perform the one or more provisioning operations to generate a provisioning item; and sign the provisioning item to generate a signed provisioning item.

18. The system of clause 17, wherein the provisioning request comprises a public key infrastructure (PKI) certificate signing request or an authorization credential generation request.

19. The system of clauses 17 or 18, wherein the verification item comprises an Internet Protocol (IP) number, a domain name, a certificate that includes a public key, or a device type.

20. The system of any of clauses 17-19, wherein the device comprises a computing device, a smart phone, a wearable technology device, an appliance, or a sensor.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for establishing trust in an internet of things ("IoT") device when provisioning the IoT device, the method comprising:
 receiving, at a registration service executing on a hardware processor, a provisioning request from the IoT device for provisioning the IoT device within a network, wherein the provisioning request is signed with a private key stored within a memory of the IoT device and associated with a public key having a many-to-one relationship with a plurality of private keys, wherein the private key is included in the plurality of private keys;
 determining, via the hardware processor, a verification item associated with the private key based on which the provisioning request is signed;

performing, via the hardware processor, one or more cryptographic operations on the verification item to determine that one or more provisioning operations are authorized; and performing, via the hardware processor, the one or more provisioning operations to establish a verifiable identification for the IoT device within the network.

2. The computer-implemented method of claim 1, wherein the verification item comprises a digital signature, and determining that one or more provisioning operations are authorized comprises:

identifying the public key that is associated with the digital signature; and validating the digital signature based on the public key.

3. The computer-implemented method of claim 2, wherein the private key comprises an Enhanced Privacy Identification (EPID) private key, the digital signature is generated using the EPID private key, and identifying the public key comprises selecting a EPID public key that is associated with the EPID private key.

4. The computer-implemented method of claim 2, wherein the digital signature is generated using the private key, and identifying the public key comprises performing one or more look up operations on a device manifest based on a name of the IoT device, wherein the device manifest includes a plurality of public keys.

5. The computer-implemented method of claim 1, further comprising determining that one or more provisioning operations are authorized by performing one or more look up operations on a device manifest based on the verification item.

6. The computer-implemented method of claim 5, wherein the verification item comprises an Internet Protocol (IP) number, a domain name, or a certificate that includes the public key.

7. The computer-implemented method of claim 1, wherein performing the one or more provisioning operations comprises storing the public key in a Domain Name System (DNS) based on a name of the IoT device.

8. The computer-implemented method of claim 1, wherein performing the one or more provisioning operations comprises:

signing a certificate that includes a second public key to generate a signed certificate;

storing the second public key in a Domain Name System (DNS) based on a name of the IoT device; and transmitting the signed certificate to the IoT device.

9. A non-transitory computer-readable storage medium including instructions that, when executed by a hardware processor, cause the hardware processor to perform the steps of:

receiving, at a registration service executing on the hardware processor, a first provisioning request from an IoT device for provisioning the IoT device within a network, wherein the provisioning request is signed with a private key stored within a memory of the IoT device and associated with a public key having a many-to-one relationship with a plurality of private keys, wherein the private key is included in the plurality of private keys;

determining distinguishing information associated with the IoT device in response to the first provisioning request;

selecting at least one authorization template included in a template database based on the distinguishing information; and based on the at least one authorization template, generating a first authorization credential for the IoT device to establish a verifiable identification for the IoT device within the network.

10. The non-transitory computer-readable storage medium of claim 9, wherein the distinguishing information comprises an Internet Protocol (IP) number, a domain name, an Enhanced Privacy Identification (EPID) public key, or a device type.

11. The non-transitory computer-readable storage medium of claim 9, wherein the distinguishing information comprises the public key, and determining the distinguishing information comprises reading a public key infrastructure (PKI) certificate that includes the public key.

12. The non-transitory computer-readable storage medium of claim 9, further comprising:

signing the first authorization credential to generate a signed authorization credential; and transmitting the signed authorization credential to the IoT device.

13. The non-transitory computer-readable storage medium of claim 12, further comprising inserting the signed authorization credential into a Domain Name System (DNS).

14. The non-transitory computer-readable storage medium of claim 9, further comprising:

receiving a second provisioning request for a second IoT device;

performing one or more verification operations to determine whether an identification associated with the second IoT device is reliable; and if the identification is reliable, then generating a second authorization credential for the second IoT device based on a first template that is not included in the at least one authorization template, or if the identification is not reliable, then transmitting an error message to at least one of the IoT device and the second IoT device.

15. The non-transitory computer-readable storage medium of claim 9, wherein selecting the at least one authorization template comprises performing one or more matching operations between the distinguishing information and a plurality of device profiles, wherein each device profile included in the plurality of device profiles is associated with one or more authorization templates included in the template database.

16. The non-transitory computer-readable storage medium of claim 9, wherein generating the first authorization credential comprises creating a union of all authorizations included in the at least one authorization template that are applicable to the IoT device.

17. A system comprising:

a memory storing a provisioning engine; and a hardware processor that is coupled to the memory and, when executing the provisioning engine, is configured to:

receive, at a registration service executing on the hardware processor, a provisioning request from an IoT device for provisioning the IoT device within a network, wherein the provisioning request is signed with a private key stored within a memory of the IoT device and associated with a public key having a many-to-one relationship with a plurality of private keys, wherein the private key is included in the plurality of private keys;

determine a verification item associated with the private key based on which the provisioning request is signed;

perform one or more cryptographic operations on the verification item to determine that one or more provisioning operations are authorized;

perform the one or more provisioning operations to generate a provisioning item that establishes a verifiable identification for the IoT device within the network; and sign the provisioning item to generate a signed provisioning item.

18. The system of claim 17, wherein the provisioning request comprises a public key infrastructure (PKI) certificate signing request or an authorization credential generation request.

19. The system of claim 17, wherein the verification item comprises an Internet Protocol (IP) number, a domain name, a certificate that includes the public key, or a device type.

20. The system of claim 17, wherein the IoT device comprises a computing device, a smart phone, a wearable technology device, an appliance, or a sensor.

* * * * *